United States Patent
Fukui et al.

(10) Patent No.: US 11,403,950 B2
(45) Date of Patent: Aug. 2, 2022

(54) MOVING BODY DETECTION SYSTEM

(71) Applicant: Toyota Jidosha Kabushiki Kaisha, Toyota (JP)

(72) Inventors: Yusuke Fukui, Toyota (JP); Yuzo Kaneshige, Toyota (JP); Takashi Moriya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/217,291

(22) Filed: Mar. 30, 2021

(65) Prior Publication Data

US 2021/0383700 A1  Dec. 9, 2021

(30) Foreign Application Priority Data

Jun. 3, 2020  (JP) .............................. JP2020-096659

(51) Int. Cl.
  *G08G 1/16* (2006.01)
  *G08G 1/005* (2006.01)

(52) U.S. Cl.
  CPC ............. *G08G 1/166* (2013.01); *G08G 1/005* (2013.01); *G08G 1/167* (2013.01)

(58) Field of Classification Search
  CPC ........ G08G 1/166; G08G 1/005; G08G 1/167; G08G 9/02; G08G 1/202; G08G 1/205; H04W 4/00; H04W 4/02; G01S 13/56; G01S 13/60; G01S 13/62
  See application file for complete search history.

(56) References Cited

U.S. PATENT DOCUMENTS

| | | | | |
|---|---|---|---|---|
| 9,513,702 | B2* | 12/2016 | Cho ....................... | G06F 3/1423 |
| 9,785,845 | B2* | 10/2017 | Morikawa .......... | G02B 27/0101 |
| 10,115,312 | B2* | 10/2018 | Lee ....................... | G08G 1/0962 |
| 10,488,506 | B2* | 11/2019 | Takehara ................ | G01S 7/411 |
| 10,754,022 | B2* | 8/2020 | Takehara ................ | G01S 7/411 |
| 2014/0019005 | A1* | 1/2014 | Lee ....................... | G08G 1/0962 |
| | | | | 701/301 |
| 2015/0339534 | A1* | 11/2015 | Morikawa .............. | G08G 1/164 |
| | | | | 345/633 |
| 2017/0276780 | A1* | 9/2017 | Takehara ................ | G08G 1/167 |
| 2017/0352277 | A1* | 12/2017 | Lee ........................ | G08G 1/166 |
| 2020/0114886 | A1* | 4/2020 | Kim ....................... | G01S 13/931 |

(Continued)

FOREIGN PATENT DOCUMENTS

| | | |
|---|---|---|
| JP | 2006-331154 A | 12/2006 |
| JP | 2018-147035 A | 9/2018 |

*Primary Examiner* — Sisay Yacob
(74) *Attorney, Agent, or Firm* — Dinsmore & Shohl LLP

(57) ABSTRACT

A moving body detection system detects a moving body that is present in a blind spot of a driver of a host vehicle. A main control device of the moving body detection system executes a first terminal signal acquisition process for acquiring, as a first terminal signal, a signal that a reception device has received from a first terminal control device. When the first terminal signal is acquired by the process, the main control device determines whether a blind-spot condition that a moving body is present in the blind spot is met based on the acquired first terminal signal. The main control device executes the process on a first cycle when it is determined that the condition is not met, and executes the process on a second cycle that is shorter than the first cycle when it is determined that the condition is met.

15 Claims, 12 Drawing Sheets

(56) References Cited

U.S. PATENT DOCUMENTS

2021/0245742 A1* 8/2021 Ha .................. B60W 30/09
2021/0291736 A1* 9/2021 Higashiyama ..... G02B 27/0101
2021/0312811 A1* 10/2021 Ohlarik .................. G06N 20/00

* cited by examiner

MOVING BODY DETECTION SYSTEM

CROSS-REFERENCE TO RELATED APPLICATION

This application claims priority to Japanese Patent Application No. 2020-096659 filed on Jun. 3, 2020, incorporated herein by reference in its entirety.

BACKGROUND

1. Technical Field

The disclosure relates to a moving body detection system.

2. Description of Related Art

There are known pedestrian detection systems in which a mobile phone terminal that the pedestrian carries sounds an alert to notify the pedestrian of an approaching vehicle. As one of such pedestrian detection systems, a pedestrian detection system is known in which a radio signal is transmitted from a vehicle, and when the radio signal is received by a mobile phone terminal, it is determined whether to notify the pedestrian of an approaching vehicle based on that radio signal (e.g., see Japanese Unexamined Patent Application Publication No. 2006-331154).

SUMMARY

When a pedestrian is walking in a blind spot of a driver of a vehicle, the driver cannot visually recognize the pedestrian. Therefore, a system is desired that can accurately track the behavior of a pedestrian, including the moving speed and the moving direction of the pedestrian, to thereby provide a driver with accurate information about the pedestrian. Such a system is desirable also in a case where another vehicle is traveling in a blind spot of a driver of a host vehicle.

Generally, if the cycle of communication between a vehicle and a mobile phone terminal is short, the behavior of a moving body, such as a pedestrian or another vehicle, can be accurately tracked. However, on the other hand, there is a problem that electric power consumption of the batteries of the vehicle and the mobile phone terminal increases. While lengthening the communication cycle can curb the electric power consumption of the batteries, this raises a problem in that the behavior of a moving body cannot be accurately tracked.

The disclosure has been contrived to address these problems. One of the objects of the disclosure is to provide a moving body detection system that can accurately track the behavior of a moving body, such as a pedestrian or another vehicle, that is present in a blind spot of a driver of a host vehicle, while curbing electric power consumption.

The moving body detection system according to the disclosure is a system that detects a moving body present in a blind spot of a driver of a host vehicle.

The moving body detection system includes: a first terminal control device that is installed in a first terminal capable of being carried by a person and that transmits signals to an outside; a reception device that receives signals transmitted by the first terminal control device; and a main control device that determines whether the moving body is present in the blind spot.

The main control device is configured to execute a first terminal signal acquisition process for acquiring, as a first terminal signal, a signal that the reception device has received from the first terminal control device, and when the first terminal signal is acquired by the first terminal signal acquisition process, determine whether a blind-spot condition that the moving body is present in the blind spot is met based on the acquired first terminal signal.

The main control device executes the first terminal signal acquisition process on a first cycle when it is determined that the blind-spot condition is not met, and executes the first terminal signal acquisition process on a second cycle that is shorter than the first cycle when it is determined that the blind-spot condition is met.

In the moving body detection system according to the disclosure, the cycle of communication between the main control device and the first terminal control device (i.e., the cycle of execution of the first terminal signal acquisition process) is set to a longer cycle (i.e., the first cycle) when the blind-spot condition is not met, and is set to a shorter cycle (i.e., the second cycle), when the blind-spot condition is met. This makes it possible to accurately track the behavior of a moving body present in a blind spot while curbing electric power consumption of a battery of the host vehicle and a battery of the first terminal.

In the moving body detection system according to the disclosure, the reception device is installed, for example, in the host vehicle. Thus, a reception device of the host vehicle can be used as the reception device of the moving body detection system.

The main control device is installed, for example, in the host vehicle. Thus, a control device of the host vehicle can be used as the main control device of the moving body detection system.

The moving body detection system may further include a display device that displays an image at such a position that the driver is able to visually recognize the image. In this case, the display device is installed, for example, in the host vehicle. The main control device may be configured to, when it is determined that the blind-spot condition is met, cause the display device to display an image representing the moving body present in the blind spot. Thus, it is possible to notify the driver of the host vehicle that a moving body is present in the blind spot.

The first terminal is, for example, a mobile phone terminal or a terminal capable of being worn by a person. Thus, a terminal that is easy for a person to carry can be used as the first terminal.

The moving body detection system may further include a second terminal control device that is installed in a second terminal capable of being carried by a person. In this case, the reception device is installed, for example, in the second terminal. The main control device may be configured to, when it is determined that the second terminal is present inside the host vehicle, acquire the first terminal signal through the reception device. Thus, a reception device of the second terminal can be used as the reception device of the moving body detection system.

The moving body detection system may further include a second terminal control device that is installed in a second terminal capable of being carried by a person. In this case, the main control device is, for example, the second terminal control device. The main control device may be configured to, when it is determined that the second terminal is present inside the host vehicle and the first terminal signal is acquired, determine whether the blind-spot condition is met based on the first terminal signal. Thus, a control device of the second terminal can be used as the main control device of the moving body detection system.

The moving body detection system may further include a display device that displays an image at such a position that the driver is able to visually recognize the image, and a second terminal control device that is installed in a second terminal capable of being carried by a person. In this case, the display device is installed, for example, in the second terminal. The main control device may be configured to, when it is determined that the second terminal is present inside the host vehicle and the first terminal signal is acquired, determine whether the blind-spot condition is met based on the first terminal signal, and when it is determined that the blind-spot condition is met, cause the display device to display an image representing the moving body present in the blind spot. Thus, it is possible to notify the driver of the host vehicle that a moving body is present in the blind spot using a display device of the second terminal.

The second terminal is, for example, a mobile phone terminal or a terminal capable of being worn by a person. Thus, a terminal that is easy for a person to carry can be used as the second terminal.

The main control device may be configured to, when the blind-spot condition is met, notify the driver that the moving body is present in the blind spot. Thus, the driver of the host vehicle can learn that a moving body is present in the blind spot.

The moving body detection system may further include a detection device that detects a state on a front side in an advancing direction of the host vehicle. In this case, the detection device is installed in the host vehicle. The main control device may be configured to acquire, as front-side state detection information, information about a state detected by the detection device, and specify the blind spot based on the acquired front-side state detection information. Thus, the main control device can specify the blind spot using the detection device of the host vehicle.

The moving body detection system may further include a detection device that detects a state on a front side in an advancing direction of the host vehicle. In this case, the detection device is installed, for example, on a road. The main control device may be configured to acquire, as front-side state detection information, information about a state detected by the detection device, and specify the blind spot based on the acquired front-side state detection information. Thus, the main control device can specify the blind spot using a detection device installed on a road.

The moving body detection system may further include a detection device that detects a state on a front side in an advancing direction of the host vehicle. In this case, the detection device is installed, for example, in the host vehicle. The main control device may be configured to acquire, as front-side state detection information, information about a state detected by the detection device, and when it is determined that the moving body is not present on the front side in the advancing direction of the host vehicle based on the front-side state detection information and it is determined that the first terminal is present on the front side in the advancing direction of the host vehicle based on the first terminal signal, determine that the blind-spot condition is met. Thus, the main control device can determine whether the blind-spot condition is met using a detection device of the host vehicle.

The moving body detection system may further include a detection device that detects a state on a front side in an advancing direction of the host vehicle. In this case, the detection device is installed, for example, on a road. The main control device may be configured to acquire, as front-side state detection information, information about a state detected by the detection device, and when it is determined that the moving body is not present on the front side in the advancing direction of the host vehicle based on the front-side state detection information and it is determined that the first terminal is present on the front side in the advancing direction of the host vehicle based on the first terminal signal, determine that the blind-spot condition is met. Thus, the main control device can determine whether the blind-spot condition is met using a detection device installed on a road.

The main control device may be configured to specify the blind spot based on a current position of the host vehicle and map information on surroundings of the host vehicle. Thus, the blind spot can be more accurately specified.

The constituent elements of the disclosure are not limited by embodiments of the disclosure to be described below with reference to the drawings. Other objects, other characteristics, and accompanying advantages of the disclosure will be easily understood from the description of the embodiments of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Moving body detection systems according to embodiments of the disclosure will be described below with reference to the drawings.

First Embodiment

Figure 1:
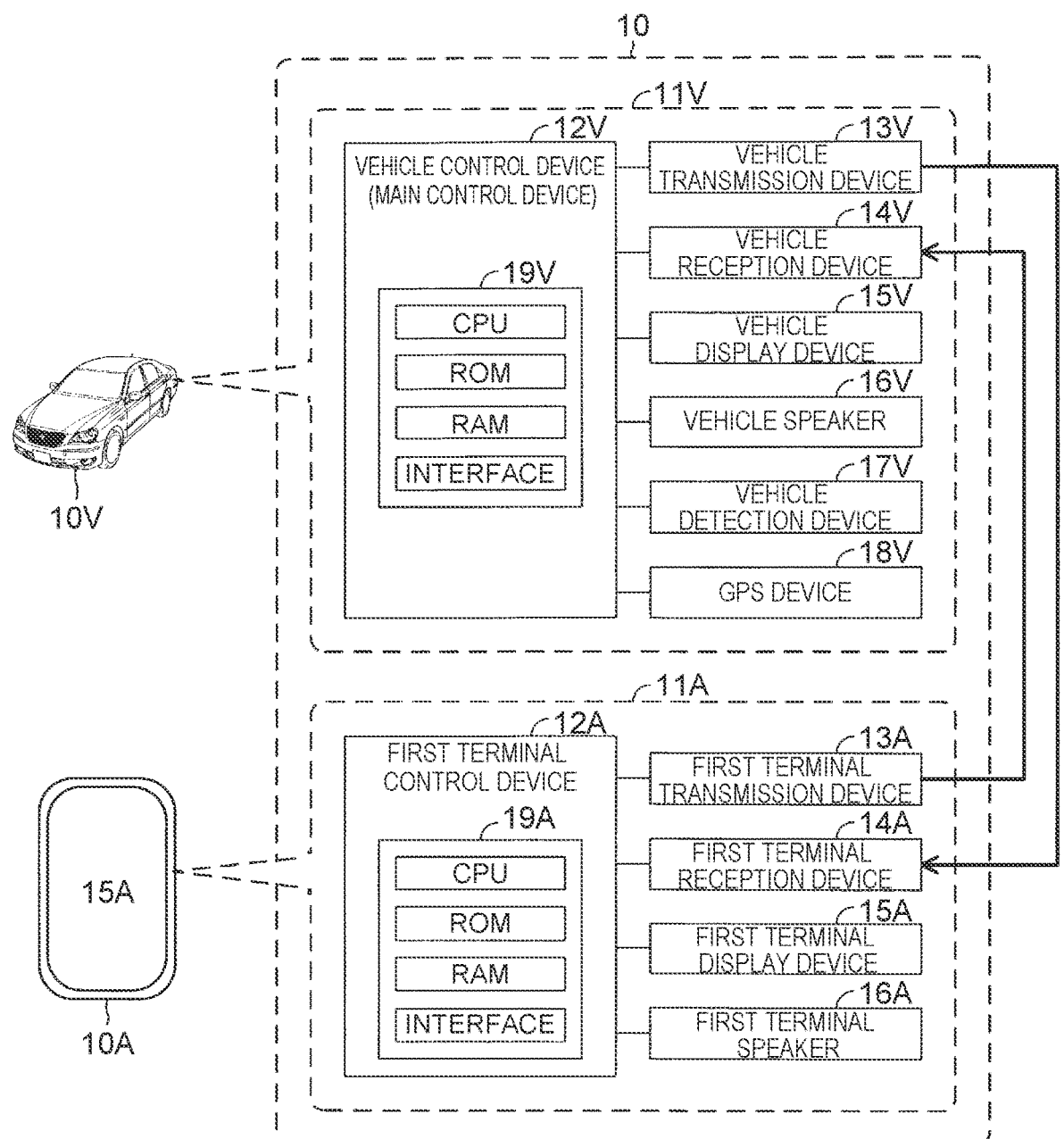
FIG. 1 is a diagram showing a moving body detection system according to a first embodiment of the disclosure.

As shown in FIG. 1, a moving body detection system 10 according to a first embodiment of the disclosure includes a vehicle control system 11V and a first terminal control system 11A.

Vehicle Control System

The vehicle control system 11V includes a vehicle control device 12V, a vehicle transmission device 13V, a vehicle reception device 14V, a vehicle display device 15V, a vehicle speaker 16V, a vehicle detection device 17V, and a GPS device 18V.

Vehicle Control Device

The vehicle control device 12V is installed in a host vehicle 10V. The vehicle control device 12V includes an electronic control device (i.e., an ECU) 19V. The ECU 19V of the vehicle control device 12V includes a CPU, an ROM, an RAM, and an interface. The vehicle control device 12V is configured to be able to determine whether a moving body MB, such as a pedestrian or another vehicle, is present in a blind spot BLD of a driver of the host vehicle 10V. In the first embodiment, the vehicle control device 12V functions as a main control device. Hereinafter, the driver of the host vehicle 10V will be referred to as a "driver 10D."

Vehicle Transmission Device

The vehicle transmission device 13V is installed in the host vehicle 10V. The vehicle transmission device 13V is electrically connected to the vehicle control device 12V. The vehicle control device 12V can wirelessly transmit signals to an outside through the vehicle transmission device 13V. Hereinafter, signals that the vehicle control device 12V wirelessly transmits to the outside will be referred to as "vehicle signals SV." Signals that are wirelessly transmitted to the outside or signals that have been wirelessly transmitted to the outside will be referred to as "radio signals."

Vehicle Reception Device

The vehicle reception device 14V is installed in the host vehicle 10V. The vehicle reception device 14V is electrically connected to the vehicle control device 12V. The vehicle control device 12V can acquire radio signals through the vehicle reception device 14V.

The vehicle transmission device 13V and the vehicle reception device 14V may be one reception-transmission device having both a function of receiving radio signals and a function of transmitting radio signals.

Vehicle Display Device

The vehicle display device 15V is installed in the host vehicle 10V. More specifically, the vehicle display device 15V is installed at such a position in the host vehicle 10V that the driver 10D can visually recognize the vehicle display device 15V. The vehicle display device 15V is, for example, a display of a so-called navigation device or a so-called head-up display. The vehicle display device 15V is electrically connected to the vehicle control device 12V. The vehicle control device 12V can display various images on the vehicle display device 15V.

Vehicle Speaker

The vehicle speaker 16V is installed in the host vehicle 10V. The vehicle speaker 16V is electrically connected to the vehicle control device 12V. The vehicle control device 12V can produce various sounds from the vehicle speaker 16V. The vehicle speaker 16V is installed in the host vehicle 10V in such a manner that the driver 10D can hear the produced sounds.

Vehicle Detection Device

The vehicle detection device 17V is installed in the host vehicle 10V. The vehicle detection device 17V detects a state on a front side in an advancing direction of the host vehicle 10V. The state on the front side in the advancing direction includes a state on a front side in a front-rear direction of the host vehicle 10V when the host vehicle 10V is moving forward, and a state on a rear side in the front-rear direction of the host vehicle 10V when the host vehicle 10V is moving backward. The state on the front side in the advancing direction is a state of a range having a certain width or angle relatively to the front-rear direction of the host vehicle 10V.

The vehicle detection device 17V is, for example, at least one of a camera device, a radar sensor device, and an optical sensor device. The camera device is a device equipped with a camera, such as a CCD camera. The radar sensor device is a device equipped with a radar sensor, such as a millimeter-wave radar sensor. The optical sensor device is a device equipped with an optical sensor, and is a device adopting, for example, the light detection and ranging (LiDAR) method.

The vehicle detection device 17V is electrically connected to the vehicle control device 12V. The vehicle detection device 17V transmits a signal indicating front-side state detection information to the vehicle control device 12V. The front-side state detection information is information about a state on the front side in the advancing direction of the host vehicle 10V that is detected by the vehicle detection device 17V. The vehicle control device 12V acquires the front-side state detection information from this signal.

For example, when the vehicle detection device 17V is a camera device, the camera device takes an image of a state on the front side in the advancing direction of the host vehicle 10V and transmits the obtained image data to the vehicle control device 12V. From this data, the vehicle control device 12V acquires information about the state on the front side in the advancing direction of the host vehicle 10V as the front-side state detection information.

When the vehicle detection device 17V is a radar sensor device, the radar sensor device transmits radio waves in the advancing direction of the host vehicle 10V, and when the radio waves having reflected off a three-dimensional object, such as a person, an installation, or a building, reach the radar sensor device, receives these radio waves. Based on data about the transmitted radio waves and the received radio waves, the radar sensor device transmits, to the vehicle control device 12V, information about the distance between the three-dimensional object and the host vehicle 10V, the direction in which the three-dimensional object is located relatively to the host vehicle 10V, etc. From this information, the vehicle control device 12V acquires, as the front-side state detection information, information about the distance between the three-dimensional object and the host vehicle 10V, the direction in which the three-dimensional object is located relatively to the host vehicle 10V, etc.

The radar sensor device may be configured to transmit data about the transmitted radio waves and the received radio waves itself to the vehicle control device 12V. In this case, the vehicle control device 12V acquires, from this data, information about the distance between the three-dimensional object and the host vehicle 10V, the direction in which the three-dimensional object is located relatively to the host vehicle 10V, etc. as the front-side state detection information.

When the vehicle detection device 17V is an optical sensor device, the optical sensor device transmits a laser beam in the advancing direction of the host vehicle 10V, and when the laser beam having reflected off a three-dimensional object, such as a person, an installation, or a building, reaches the optical sensor device, receives this laser beam. Based on data about the transmitted laser beam and the received laser beam, the optical sensor device transmits, to the vehicle control device 12V, information about the distance between the three-dimensional object and the host vehicle 10V, the direction in which the three-dimensional object is located relatively to the host vehicle 10V, etc. From this information, the vehicle control device 12V acquires, as the front-side state detection information, information about the distance between the three-dimensional object and the host vehicle 10V, the direction in which the three-dimensional object is located relatively to the host vehicle 10V, etc.

The optical sensor device may be configured to transmit data about the transmitted laser beam and the received laser beam itself to the vehicle control device 12V. In this case, the vehicle control device 12V acquires, from this data, information about the distance between the three-dimensional object and the host vehicle 10V, the direction in which the three-dimensional object is located relatively to the host vehicle 10V, etc. as the front-side state detection information.

Figure 2:
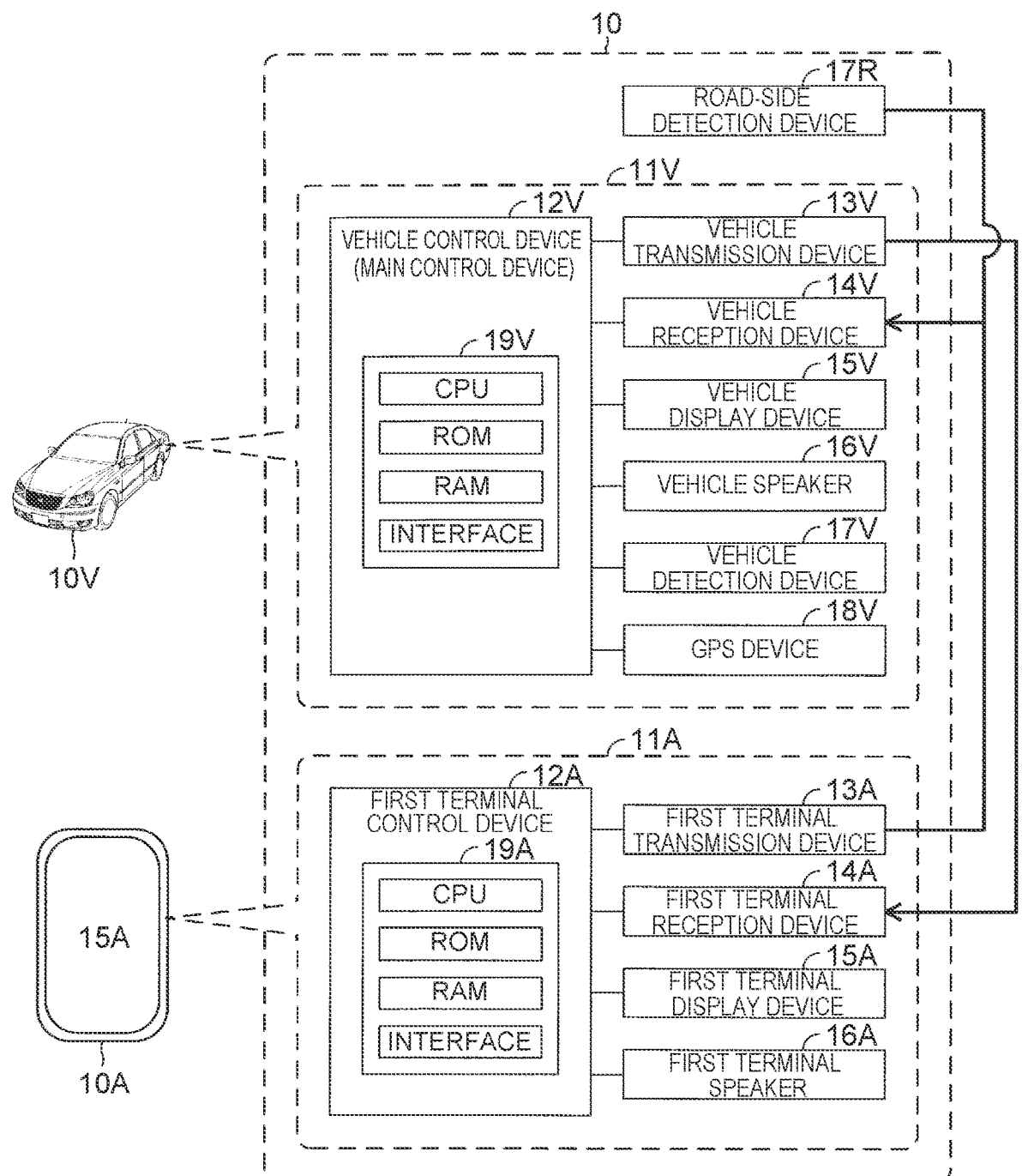
FIG. 2 is a diagram showing another moving body detection system according to the first embodiment.

As shown in FIG. 2, the moving body detection system 10 may include, in place of or in addition to the vehicle detection device 17V, a road-side detection device 17R that is installed on a road (particularly, at a location by a road and/or a location above a road). In this embodiment, the road-side detection device 17R is used to acquire the state on the front side in the advancing direction of the host vehicle 10V. The road-side detection device 17R is, for example, a security camera device. The security camera device is a device equipped with a camera, such as a CCD camera. The road-side detection device 17R is configured to be able to transmit radio signals.

As shown in FIG. 2, the road-side detection device 17R transmits information about a detected state on the front side in the advancing direction of the host vehicle 10V in the form of a radio signal. The vehicle control device 12V acquires this radio signal through the vehicle reception device 14V. From this radio signal, the vehicle control device 12V acquires the information about the state on the front side in the advancing direction of the host vehicle 10V as the front-side state detection information.

For example, when the road-side detection device 17R is a security camera device, the security camera device takes an image of a state of surroundings of a place where the security camera device is installed, and transmits the obtained image data in the form of a radio signal. The vehicle control device 12V acquires this radio signal through the vehicle reception device 14V. From this radio signal, the vehicle control device 12V extracts data on an image of the state on the front side in the advancing direction of the host vehicle 10V. From the extracted data, the vehicle control device 12V acquires information about the state on the front side in the advancing direction of the host vehicle 10V as the front-side state detection information.

As the method of communication between the road-side detection device 17R and the vehicle reception device 14V, the moving body detection system 10 adopts a direct communication method by which the two devices wirelessly and directly communicate with each other, but a cloud-based communication method may instead be adopted.

GPS Device

The GPS device 18V is installed in the host vehicle 10V. The GPS device 18V is electrically connected to the vehicle control device 12V. The GPS device 18V receives a so-called GPS signal. The GPS device 18V transmits the received GPS signal to the vehicle control device 12V. The vehicle control device 12V can acquire a current position of the host vehicle 10V from the GPS signal transmitted from the GPS device 18V.

Map Information

The vehicle control device 12V stores map information. The vehicle control device 12V may be configured to be able to acquire map information from a server on the Web.

First Terminal Control System

The first terminal control system 11A includes a first terminal control device 12A, a first terminal transmission device 13A, a first terminal reception device 14A, a first terminal display device 15A, and a first terminal speaker 16A.

First Terminal Control Device

The first terminal control device 12A is installed in a first terminal 10A. The first terminal 10A is a terminal capable of being carried by a person, and is, for example, a mobile phone terminal or a terminal capable of being worn by a person. In the first embodiment, the first terminal 10A is carried by a moving body, such as a pedestrian or a driver or a passenger of another vehicle, that is present outside the host vehicle 10V.

The first terminal control device 12A includes an electronic control device (i.e., an ECU) 19A. The ECU 19A of the first terminal 10A includes a CPU, an ROM, an RAM, and an interface.

First Terminal Transmission Device

The first terminal transmission device 13A is installed in the first terminal 10A. The first terminal transmission device 13A is electrically connected to the first terminal control device 12A. The first terminal control device 12A can transmit radio signals through the first terminal transmission device 13A. Hereinafter, radio signals that are transmitted by the first terminal control device 12A will be referred to as "first terminal signals SA."

First Terminal Reception Device

The first terminal reception device 14A is installed in the host vehicle 10V. The first terminal reception device 14A is electrically connected to the first terminal control device 12A. The first terminal control device 12A can acquire radio signals through the first terminal reception device 14A.

The first terminal transmission device 13A and the first terminal reception device 14A may be one reception-transmission device having both a function of receiving radio signals and a function of transmitting radio signals.

First Terminal Display Device

The first terminal display device 15A is installed in the first terminal 10A. The first terminal display device 15A is electrically connected to the first terminal control device 12A. The first terminal control device 12A can display various images on the first terminal display device 15A. The first terminal display device 15A is, for example, a display of the first terminal 10A.

First Terminal Speaker

The first terminal speaker 16A is installed in the first terminal 10A. The first terminal speaker 16A is electrically connected to the first terminal control device 12A. The first terminal control device 12A can produce various sounds from the first terminal speaker 16A.

As the method of communication between the first terminal transmission device 13A and the vehicle reception device 14V and the method of communication between the vehicle transmission device 13V and the first terminal reception device 14A, the moving body detection system 10 adopts a direct communication method by which the two devices wirelessly and directly communicate with each other, but a cloud-based communication method may instead be adopted.

In this example, the first terminal control device 12A is configured to execute processes relating to the operation of the first terminal control device 12A, such as a signal transmission process and a signal acquisition process, even when a dedicated application is not run on the first terminal control device 12A. However, the first terminal control device 12A may be configured to execute these processes only when a dedicated moving body detection application is run on the first terminal control device 12A. The moving body detection application is an application that is installed on the first terminal control device 12A beforehand and that is started by a person carrying the first terminal 10A to use the first terminal 10A as part of the moving body detection system 10.

Operation of Moving Body Detection System

Next, the operation of the moving body detection system 10 will be described.

While a blind-spot condition Cbld, to be described later, is not met, the vehicle control device 12V is executing a signal acquisition process for acquiring radio signals on a first cycle.

While a blind-spot condition meeting signal Sbld, to be described later, is not acquired, the first terminal control device 12A is executing a signal transmission process for transmitting radio signals (i.e., the first terminal signals SA) on a first cycle and executing a signal acquisition process for acquiring radio signals on a first cycle.

Hereinafter, the first cycle on which the signal acquisition process is executed will be referred to as a "first acquisition cycle $Cy1\_r$," and the first cycle on which the signal transmission process is executed will be referred to as a "first transmission cycle $Cy1\_t$." The cycle on which the signal acquisition process is executed will be referred to as a "signal acquisition cycle," and the cycle on which the signal transmission process is executed will be referred to as a "signal transmission cycle."

The range that the first terminal signals SA can reach is limited. Therefore, when the first terminal 10A is present at a place far away from the host vehicle 10V and the first terminal signals SA cannot reach the vehicle reception device 14V, the vehicle control device 12V cannot acquire the first terminal signals SA by executing the signal acquisition process. On the other hand, when the first terminal 10A is located at a place close to the host vehicle 10V and the first terminal signals SA can reach the vehicle reception device 14V, the vehicle control device 12V can acquire the first terminal signals SA by the signal acquisition process.

Upon acquiring the first terminal signal SA, the vehicle control device 12V specifies a blind spot BLD. The blind spot BLD is an area on the front side in the advancing direction of the host vehicle 10V that the driver 10D cannot visually recognize. How to specify the blind spot BLD will be described later.

The first terminal signal SA indicates at least identification information indicating that the signal is a signal transmitted from the first terminal control device 12A, and information on the position of the first terminal 10A. From the first terminal signal SA, the vehicle control device 12V can acquire information on the position of the first terminal 10A. Hereinafter, the information on the position of the first terminal 10A will be referred to as "first terminal position information."

When it is determined that the first terminal 10A is present in the blind spot BLD based on the first terminal position information and the blind spot BLD, the vehicle control device 12V determines that the blind-spot condition Cbld is met. In other words, the vehicle control device 12V determines that a moving body MB is present in the blind spot BLD.

Figure 3:
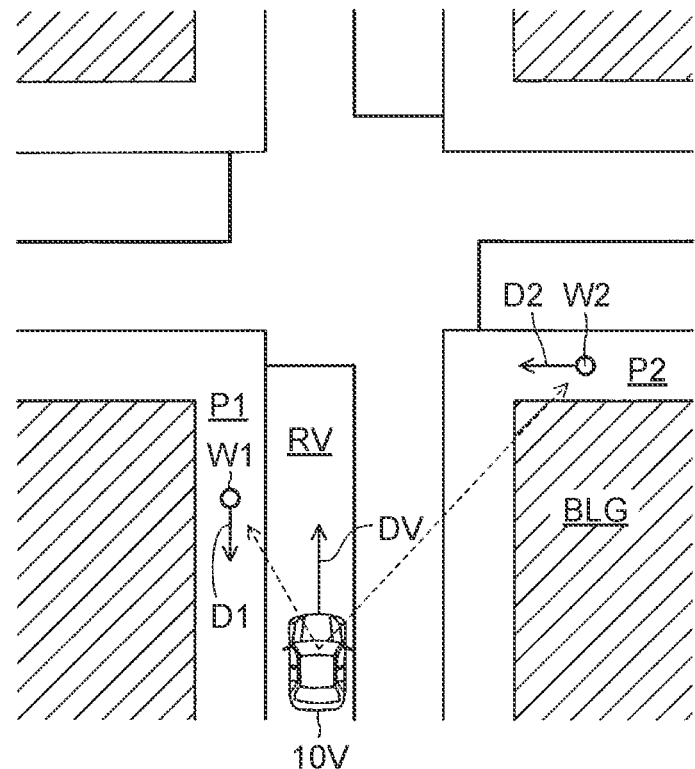
FIG. 3 is a view used to describe the operation of the moving body detection system according to the first embodiment.

For example, when a pedestrian W1 carries the first terminal 10A as shown in FIG. 3, the driver 10D can visually recognize the pedestrian W1. In this case, the vehicle control device 12V determines that the blind-spot condition Cbld is not met. In the example shown in FIG. 3, the pedestrian W1 is walking on a sidewalk P1 in a direction D1, and the host vehicle 10V is traveling on a road RV in a direction DV.

On the other hand, when a pedestrian W2 carries the first terminal 10A, the pedestrian W2 is present on the other side of a building BLG relatively to the driver 10D and therefore the driver 10D cannot visually recognize the pedestrian W2. In this case, the vehicle control device 12V determines that the blind-spot condition Cbld is met. In the example shown in FIG. 3, the pedestrian W2 is walking on a sidewalk P2 in a direction D2.

Upon determining that the blind-spot condition Cbld is met, the vehicle control device 12V changes the signal acquisition cycle from a first acquisition cycle $Cy1\_r$ to a second cycle. Hereinafter, the second cycle on which the signal acquisition process is executed will be referred to as a "second acquisition cycle $Cy2\_r$." The second acquisition cycle $Cy2\_r$ is a cycle shorter than the first acquisition cycle $Cy1\_r$.

Therefore, the vehicle control device 12V executes the signal acquisition process on the second acquisition cycle $Cy2\_r$ after determining that the blind-spot condition Cbld is met until determining that the blind-spot condition Cbld is not met.

Further, upon determining that the blind-spot condition Cbld is met, the vehicle control device 12V starts the signal transmission process. Thereafter, the vehicle control device 12V executes the signal transmission process on a second cycle until determining that the blind-spot condition Cbld is not met. Hereinafter, the second cycle on which the signal transmission process is executed will be referred to as a "second transmission cycle $Cy2\_t$." The second transmission cycle $Cy2\_t$ is set to a cycle shorter than the first transmission cycle $Cy1\_t$. In this example, the second transmission cycle $Cy2\_t$ is set to a cycle of the same length as the second acquisition cycle $Cy2\_r$.

When the signal transmission process needs to be executed also after it is determined that the blind-spot condition Cbld is not met, the vehicle control device 12V executes the signal transmission process on the first transmission cycle $Cy1\_t$.

The vehicle control device 12V transmits the blind-spot condition meeting signal Sbld by the signal transmission process. The blind-spot condition meeting signal Sbld is a vehicle signal SV indicating that the blind-spot condition Cbld is met.

Upon acquiring the blind-spot condition meeting signal Sbld, the first terminal control device 12A changes the signal transmission cycle from the first transmission cycle $Cy1\_t$ to the second transmission cycle $Cy2\_t$ and changes the signal acquisition cycle from the first acquisition cycle $Cy1\_r$ to the second acquisition cycle $Cy2\_r$.

Therefore, the first terminal control device 12A executes the signal transmission process on the second transmission cycle Cy2_t, and executes the signal acquisition process on the second acquisition cycle Cy2_r, after acquiring the blind-spot condition meeting signal Sbld until stopping acquiring the blind-spot condition meeting signal Sbld.

Further, upon determining that the blind-spot condition Cbld is met, the vehicle control device 12V determines whether a first notification condition C1 is met. The vehicle control device 12V may be configured to determine that the first notification condition C1 is also met upon determining that the blind-spot condition Cbld is met. In this example, however, the vehicle control device 12V determines that the first notification condition C1 is met when a calculated likelihood-of-collision value Vc is equal to or larger than a predetermined first calculated value Vc_1.

Calculated Likelihood-of-Collision Value

The vehicle control device 12V calculates the calculated likelihood-of-collision value Vc as follows. The vehicle control device 12V analyzes the positions of the first terminal 10A acquired from the first terminal position information indicated by the first terminal signals SA in chronological order and thereby acquires a first terminal behavior parameter. The first terminal behavior parameter is a parameter indicating the behavior of the first terminal 10A, including the moving speed and the moving direction of the first terminal 10A. In addition, the vehicle control device 12V acquires a host vehicle behavior parameter. The host vehicle behavior parameter is a parameter indicating the behavior of the host vehicle 10V, including the moving speed and the moving direction of the host vehicle 10V that are acquired from the travel speed and the steering angle of the host vehicle 10V, the front-side state detection information, etc.

Based on these behavior parameters, the vehicle control device 12V can learn the likelihood of collision between the host vehicle 10V and the person carrying the first terminal 10A. Based on these behavior parameters, the vehicle control device 12V calculates, as the calculated likelihood-of-collision value Vc, a value indicating the likelihood of collision between the host vehicle 10V and the person carrying the first terminal 10A. In this example, the calculated likelihood-of-collision value Vc becomes larger as the likelihood of collision between the host vehicle 10V and the person carrying the first terminal 10A becomes higher.

Upon determining that the first notification condition C1 is met, the vehicle control device 12V notifies the driver 10D that a moving body MB is present in the blind spot BLD. More specifically, upon determining that the first notification condition C1 is met, the vehicle control device 12V executes a vehicle display process to thereby notify the driver 10D that a moving body MB is present in the blind spot BLD. The vehicle display process is a process of displaying a notification image on the vehicle display device 15V. The notification image displayed on the vehicle display device 15V is an image representing a moving body MB present in the blind spot BLD.

Figure 4:
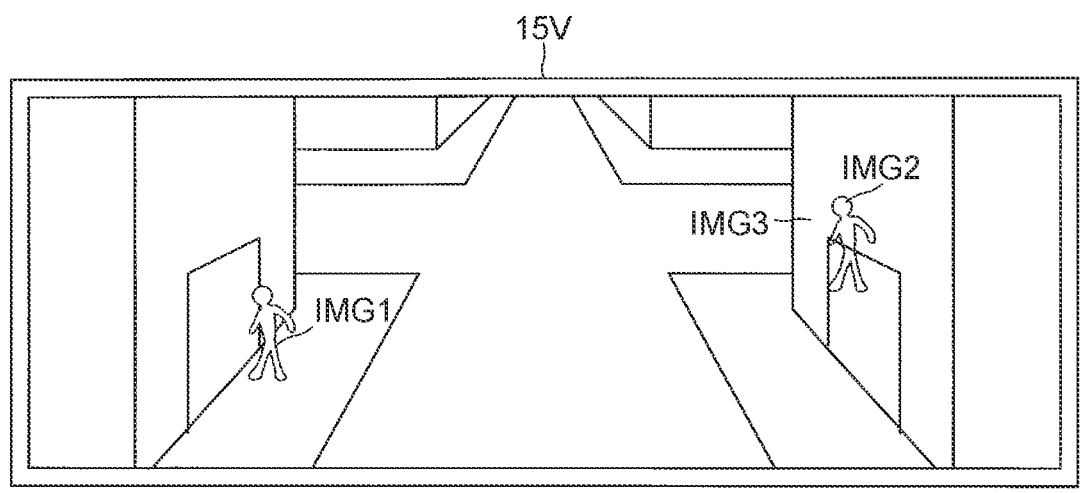
FIG. 4 is a view showing one example of a vehicle display device according to the first embodiment.

For example, when the vehicle display device 15V is a display of a navigation device, as shown in FIG. 4, the vehicle control device 12V displays an image IMG2 of a pedestrian at a position corresponding to the first terminal 10A on the display of the navigation device by the vehicle display process. In the example shown in FIG. 4, the other part of the image than the image IMG2 of the pedestrian is an image taken by a camera device. The image IMG1 is an image of the pedestrian W1 shown in FIG. 3, and the image IMG3 is an image of the building BLG shown in FIG. 3.

Thus, the driver 10D of the host vehicle 10V can learn that a moving body MB is present in the blind spot BLD.

In this example, upon determining that the first notification condition C1 is met, the vehicle control device 12V displays an image of a pedestrian on the vehicle display device 15V based on the assumption that the first terminal 10A is carried by the pedestrian. However, in a case where the first terminal control device 12A can transmit a first terminal signal SA indicating that the first terminal 10A is present inside a vehicle other than the host vehicle 10V, the vehicle control device 12V may be configured to, when this first terminal signal SA is acquired and it is determined that the first notification condition C1 is met, determine that the first terminal 10A is carried by a person riding in a vehicle and display an image of the vehicle at a position on the vehicle display device 15V corresponding to the position of the first terminal 10A.

Further, upon determining that the first notification condition C1 is met, the vehicle control device 12V transmits a first terminal display command signal Sdis_A. The first terminal display command signal Sdis_A is a vehicle signal SV indicating a first terminal display command.

Upon acquiring the first terminal display command signal Sdis_A, the first terminal control device 12A notifies the person carrying the first terminal 10A that a vehicle (i.e., the host vehicle 10V) is present in the blind spot BLD. More specifically, upon acquiring the first terminal display command signal Sdis_A, the first terminal control device 12A executes a first terminal display process to thereby notify the person carrying the first terminal 10A that a vehicle is present in the blind spot BLD. The first terminal display process is a process of displaying a notification image on the first terminal display device 15A. The notification image displayed on the first terminal display device 15A may be any image that allows the person carrying the first terminal 10A to recognize that a vehicle is present in the blind spot BLD.

For example, when the first terminal display device 15A is a display of the first terminal 10A, the first terminal control device 12A displays a notification image on the display of the first terminal 10A by the first terminal display process.

Thus, the person carrying the first terminal 10A can learn that a moving body MB (in the case of this example, a vehicle) is present in the blind spot BLD.

Further, upon determining that the first notification condition C1 is met, the vehicle control device 12V determines whether a second notification condition C2 is met. The vehicle control device 12V may be configured to determine that the second notification condition C2 is also met upon determining that the first notification condition C1 is met. In this example, however, the vehicle control device 12V determines that the second notification condition C2 is met when the calculated likelihood-of-collision value Vc is equal to or larger than a second calculated value Vc_2. The second calculated value Vc_2 is set to a value larger than the first calculated value Vc_1.

Upon determining that the second notification condition C2 is met, the vehicle control device 12V executes a vehicle alert process to thereby notify the driver 10D that a moving body MB is present in the blind spot BLD. The vehicle alert process is a process of producing a notification sound from the vehicle speaker 16V. The notification sound produced from the vehicle speaker 16V may be a monotonous alert sound or may be a human voice (announcement).

Thus, the driver 10D can learn that a moving body MB (e.g., a pedestrian) is present in the blind spot BLD.

Further, upon determining that the second notification condition C2 is met, the vehicle control device 12V transmits a first terminal alert command signal Sale_A. The first terminal alert command signal Sale_A is a vehicle signal SV indicating a first terminal alert command.

Upon acquiring the first terminal alert command signal Sale_A, the first terminal control device 12A notifies the person carrying the first terminal 10A that a vehicle (i.e., the host vehicle 10V) is present in the blind spot BLD. More specifically, upon acquiring the first terminal alert command signal Sale_A, the first terminal control device 12A executes a first terminal alert process to thereby notify the person carrying the first terminal 10A that a moving body MB is present in the blind spot BLD. The first terminal alert process is a process of producing a notification sound from the first terminal speaker 16A. The notification sound produced from the first terminal speaker 16A may be a monotonous alert sound or a human voice (announcement).

Thus, the person carrying the first terminal 10A can learn that a moving body MB (in the case of this example, a vehicle) is present in the blind spot BLD.

The vehicle control device 12V may be configured to transmit a vehicle signal SV indicating the calculated likelihood-of-collision value Vc, instead of transmitting the first terminal display command signal Sdis_A and the first terminal alert command signal Sale_A. In this case, the first terminal control device 12A acquires the calculated likelihood-of-collision value Vc from the vehicle signal SV. The first terminal control device 12A executes the first terminal display process when the calculated likelihood-of-collision value Vc is equal to or larger than the first calculated value Vc_1, and executes the first terminal alert process when the calculated likelihood-of-collision value Vc is equal to or larger than the second calculated value Vc_2.

Specification of Blind Spot

Next, how to specify the blind spot BLD will be described. The map information includes information on objects that create blind spots of drivers of vehicles, such as buildings and installations. Thus, an area that constitutes a blind spot of the driver 10D can be learned from the current position of the host vehicle 10V and the map information. Therefore, the vehicle control device 12V specifies the blind spot BLD based on the current position of the host vehicle 10V and the map information.

Or, when the position of the first terminal 10A is located from the first terminal position information indicated by the first terminal signal SA and a moving body MB that is present at that position is not acquired from the front-side state detection information, an area around the position of the first terminal 10A is an area constituting a blind spot of the driver 10D. Therefore, the vehicle control device 12V may be configured to specify the blind spot BLD based on the first terminal position information indicated by the first terminal signal SA and the front-side state detection information.

When the first terminal display command signal Sdis_A is acquired from a plurality of vehicles present in the same blind spot BLD, the first terminal control device 12A executes the first terminal display process only once for that blind spot BLD. Similarly, when the first terminal alert command signal Sale_A is acquired from a plurality of vehicles present in the same blind spot BLD, the first terminal control device 12A executes the first terminal alert process only once for that blind spot BLD.

When the first terminal display command signal is acquired from a plurality of vehicles present in different blind spots BLD, the first terminal control device 12A executes the first terminal display process for only the closest vehicle. Similarly, when the first terminal alert command signal is acquired from a plurality of vehicles present in different blind spots BLD, the first terminal control device 12A executes the first terminal alert process only once.

When the first notification condition C1 is met for a plurality of moving bodies MB present in the same blind spot BLD, the vehicle control device 12V may display only one moving body MB, or more than one moving body MB (particularly, all the moving bodies MB), by the first terminal display process for that blind spot BLD. When the second notification condition C2 is met for a plurality of moving bodies MB present in the same blind spot BLD, the vehicle control device 12V may execute the first terminal alert process only once, or more than once (particularly, the number of times equal to the number of the moving bodies MB), for that blind spot BLD.

When the first notification condition C1 is met for a plurality of moving bodies MB present in different blind spots BLD, the vehicle control device 12V may display an image of only the closest moving body MB, or images of more than one moving body MB (particularly, all the moving bodies MB), by the first terminal display process. When the second notification condition C2 is met for a plurality of moving bodies MB present in different blind spots BLD, the vehicle control device 12V may execute the vehicle alert process only once, or more than once (particularly, the number of times equal to the number of the moving bodies MB).

Thus far, the operation of the moving body detection system 10 according to the first embodiment has been described.

If the cycle of communication between the vehicle control device 12V and the first terminal control device 12A (i.e., the signal acquisition cycle and the signal transmission cycle) is short, the vehicle control device 12V can accurately track the behavior of the first terminal 10A and thereby accurately track the behavior of a moving body MB. Thus, the vehicle control device 12V can accurately monitor the behavior of a moving body MB, and as a result, can also accurately predict whether the moving body MB will suddenly appear in front of the host vehicle 10V from the blind spot BLD or whether the moving body MB will collide with the host vehicle 10V. Therefore, the vehicle control device 12V can appropriately notify the driver 10D of the presence of a moving body MB and notify the person carrying the first terminal 10A of the presence of the host vehicle 10V.

However, if the communication cycle is short, the amount of electric power consumed by the vehicle control device 12V and the first terminal control device 12A increases. As a result, the electric power consumption of the battery of the host vehicle 10V and the battery of the first terminal 10A increases.

Of course, lengthening the communication cycle can curb the electric power consumption of the batteries. However, doing so makes it impossible to accurately track the behavior of a moving body MB. As a result, it becomes impossible to accurately predict sudden appearance of a moving body MB or collision between a moving body MB and the host vehicle 10V. Thus, unable to appropriately notify the driver 10D of the presence of a moving body MB or notify the person carrying the first terminal 10A of the presence of the host vehicle 10V, the moving body detection system may annoy the driver 10D or the person carrying the first terminal 10A and, in some cases, may distract the attention of the driver 10D from the road.

In the moving body detection system 10 according to the first embodiment, the cycle of communication between the vehicle control device 12V and the first terminal control device 12A is set to a longer cycle when the blind-spot condition Cbld is not met and set to a shorter cycle when the blind-spot condition Cbld is met. This makes it possible to accurately track the behavior of a moving body MB present in the blind spot BLD while curbing electric power consumption of the battery of the host vehicle 10V and the battery of the first terminal 10A.

In this example, for the vehicle control device 12V, the first acquisition cycle $Cy1\_r$ and the first transmission cycle $Cy1\_t$ are cycles of the same length, and the second acquisition cycle $Cy2\_r$ and the second transmission cycle $Cy2\_t$ are cycles of the same length. However, as long as the second acquisition cycle $Cy2\_r$ is shorter than the first acquisition cycle $Cy1\_r$ and the second transmission cycle $Cy2\_t$ is shorter than the first transmission cycle $Cy1\_t$, the first acquisition cycle $Cy1\_r$ and the first transmission cycle $Cy1\_t$ may be cycles of different lengths, and the second acquisition cycle $Cy2\_r$ and the second transmission cycle $Cy2\_t$ may be cycles of different lengths.

Similarly, in this example, for the first terminal control device 12A, the first acquisition cycle $Cy1\_r$ and the first transmission cycle $Cy1\_t$ are cycles of the same length, and the second acquisition cycle $Cy2\_r$ and the second transmission cycle $Cy2\_t$ are cycles of the same length. However, as long as the second acquisition cycle $Cy2\_r$ is shorter than the first acquisition cycle $Cy1\_r$ and the second transmission cycle $Cy2\_t$ is shorter than the first transmission cycle $Cy1\_t$, the first acquisition cycle $Cy1\_r$ and the first transmission cycle $Cy1\_t$ may be cycles of different lengths, and the second acquisition cycle $Cy2\_r$ and the second transmission cycle $Cy2\_t$ may be cycles of different lengths.

Specific Operation of Moving Body Detection System

Next, the specific operation of the moving body detection system 10 according to the first embodiment will be described.

Routine of Vehicle Control Device

Figure 5:
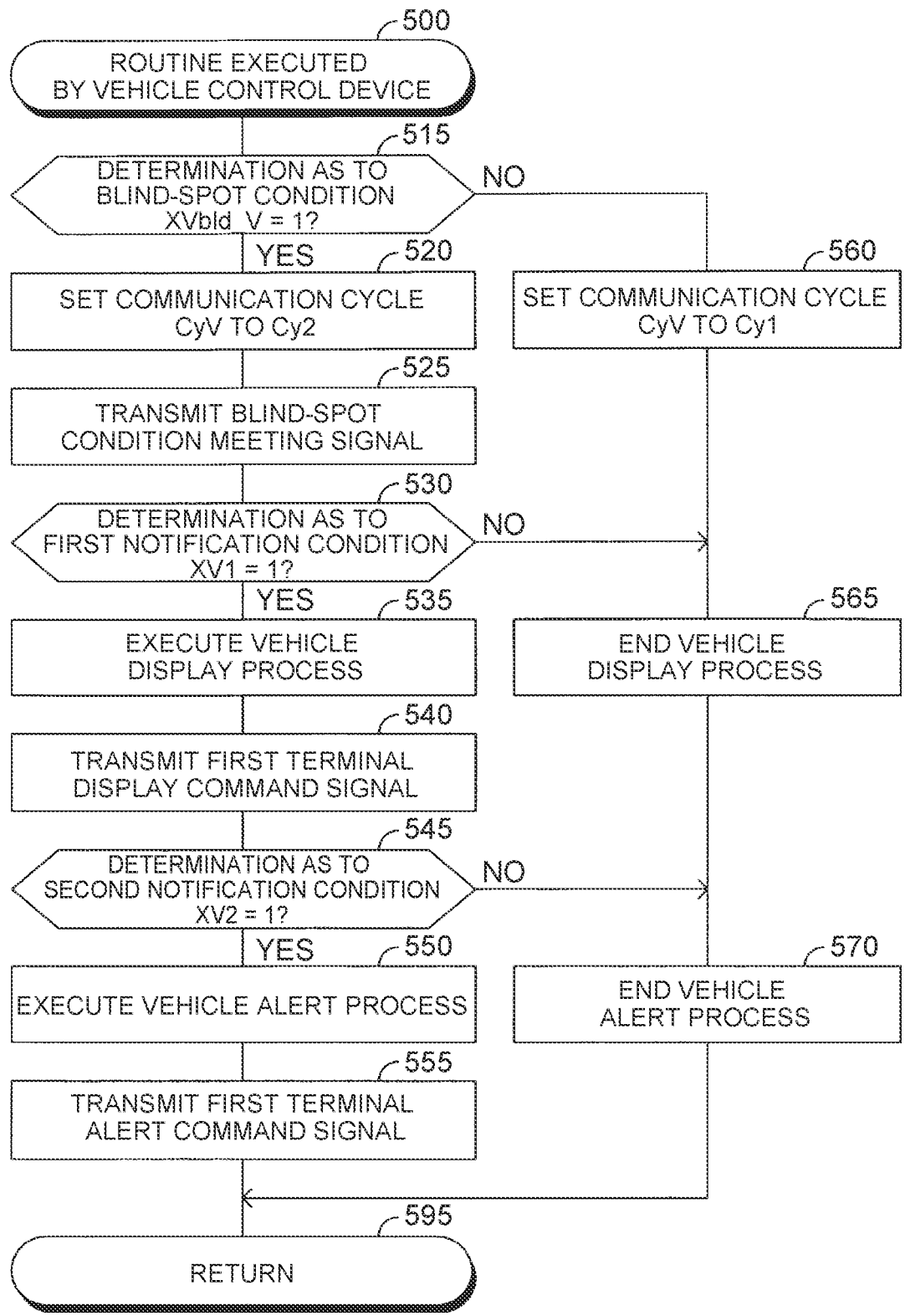
FIG. 5 is a view showing a flowchart of a routine executed by a vehicle control device according to the first embodiment.

The vehicle control device 12V of the moving body detection system 10 is configured to execute the routine shown in FIG. 5 each time a predetermined time has elapsed.

Therefore, at a predetermined timing, the vehicle control device 12V starts a process from step 500 of FIG. 5, and moves the process forward to step 515, where the vehicle control device 12V determines whether the value of a blind-spot condition meeting flag XVbld is one. The blind-spot condition meeting flag XVbld is a flag indicating whether the blind-spot condition Cbld is met.

The value of the blind-spot condition meeting flag XVbld is set to one by the vehicle control device 12V when the blind-spot condition Cbld is met, and is set to zero by the vehicle control device 12V when the blind-spot condition Cbld is no longer met.

When a "Yes" determination is made in step 515, the vehicle control device 12V moves the process forward to step 520 and sets the communication cycle CyV thereof to the second communication cycle Cy2. Specifically, the vehicle control device 12V sets the signal acquisition cycle thereof to the second acquisition cycle $Cy2\_r$ and sets the signal transmission cycle thereof to the second transmission cycle $Cy2\_t$.

Next, the vehicle control device 12V moves the process forward to step 525 and transmits the blind-spot condition meeting signal Sbld.

Next, the vehicle control device 12V moves the process forward to step 530 and determines whether the value of a first notification condition meeting flag XV1 is one. The first notification condition meeting flag XV1 is a flag indicating whether the first notification condition C1 is met.

The value of the first notification condition meeting flag XV1 is set to one by the vehicle control device 12V when the first notification condition C1 is met, and is set to zero by the vehicle control device 12V when the first notification condition C1 is no longer met.

When a "Yes" determination is made in step 530, the vehicle control device 12V moves the process forward to step 535 and executes the vehicle display process. Thus, a notification image is displayed on the vehicle display device 15V. Next, the vehicle control device 12V moves the process forward to step 540 and transmits the first terminal display command signal Sdis_A.

Next, the vehicle control device 12V moves the process forward to step 545 and determines whether the value of a second notification condition meeting flag XV2 is one. The second notification condition meeting flag XV2 is a flag indicating whether the second notification condition C2 is met.

The value of the second notification condition meeting flag XV2 is set to one by the vehicle control device 12V when the second notification condition C2 is met, and is set to zero by the vehicle control device 12V when the second notification condition C2 is no longer met.

When a "Yes" determination is made in step 545, the vehicle control device 12V moves the process forward to step 550 and executes the vehicle alert process. Thus, a notification sound is produced from the vehicle speaker 16V. Next, the vehicle control device 12V moves the process forward to step 555 and transmits the first terminal alert command signal Sale_A, and then moves the process forward to step 595 and temporarily ends the current routine.

On the other hand, when a "No" determination is made in step 545, the vehicle control device 12V moves the process forward to step 570 and ends the vehicle alert process, and then moves the process forward to step 595 and temporarily ends the current routine.

When a "No" determination is made in step 530, the vehicle control device 12V moves the process forward to step 565 and ends the vehicle display process, and then moves the process forward to step 570 and ends the vehicle alert process, and then moves the process forward to step 595 and temporarily ends the current routine.

When a "No" determination is made in step 515, the vehicle control device 12V moves the process forward to step 560 and sets the communication cycle CyV thereof to the first communication cycle Cy1. Specifically, the vehicle control device 12V sets the signal acquisition cycle thereof to the first acquisition cycle $Cy1\_r$ and sets the signal transmission cycle thereof to the first transmission cycle $Cy1\_t$.

Next, the vehicle control device 12V moves the process forward to step 565 and ends the vehicle display process, and then moves the process forward to step 570 and ends the vehicle alert process, and then moves the process forward to step 595 and temporarily ends the current routine.

Routine of First Terminal Control Device

Figure 6:
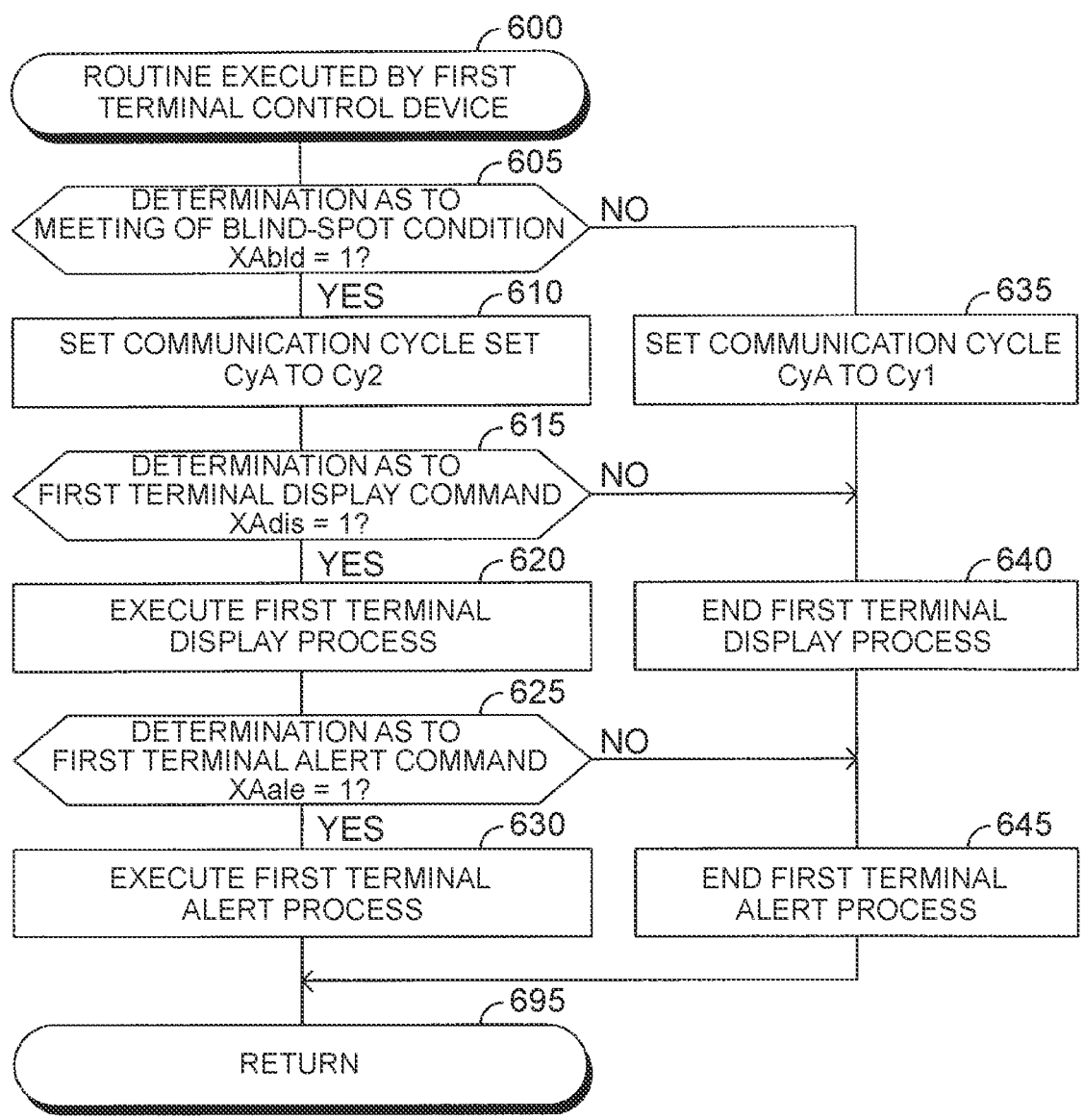
FIG. 6 is a view showing a flowchart of a routine executed by a first terminal control device according to the first embodiment.

The first terminal control device 12A of the moving body detection system 10 is configured to execute the routine shown in FIG. 6 each time a predetermined time has elapsed.

Therefore, at a predetermined timing, the first terminal control device 12A starts a process from step 600 of FIG. 6, and moves the process forward to step 605, where the first terminal control device 12A determines whether the value of a blind-spot condition meeting flag XAbld is one. The blind-spot condition meeting flag XAbld is a flag indicating whether the blind-spot condition Cbld is met.

The first terminal control device 12A sets the value of the blind-spot condition meeting flag XAbld to one upon acquiring the blind-spot condition meeting signal Sbld, and the first terminal control device 12A sets the value of the blind-spot condition meeting flag XAbld to zero upon stopping acquiring the blind-spot condition meeting signal Sbld.

When a "Yes" determination is made in step 605, the first terminal control device 12A moves the process forward to step 610 and sets the communication cycle CyA thereof to the second communication cycle Cy2. Specifically, the first terminal control device 12A sets the signal acquisition cycle thereof to the second acquisition cycle Cy2_r and sets the signal transmission cycle thereof to the second transmission cycle Cy2_t.

Next, the first terminal control device 12A moves the process forward to step 615 and determines whether the value of a first terminal display command flag XAdis is one. The first terminal display command flag XAdis is a flag indicating whether the first notification condition C1 is met.

The first terminal control device 12A sets the value of the first terminal display command flag XAdis to one upon acquiring the first terminal display command signal Sdis_A, and the first terminal control device 12A sets the value of the first terminal display command flag XAdis to zero upon stopping acquiring the first terminal display command signal Sdis_A.

When a "Yes" determination is made in step 615, the first terminal control device 12A moves the process forward to step 620 and executes the first terminal display process. Thus, a notification image is displayed on the first terminal display device 15A.

Next, the first terminal control device 12A moves the process forward to step 625 and determines whether the value of a first terminal alert command flag XAale is one. The first terminal alert command flag XAale is a flag indicating whether the second notification condition C2 is met.

The first terminal control device 12A sets the value of the first terminal alert command flag XAale to one upon acquiring the first terminal alert command signal Sale_A, and the first terminal control device 12A sets the value of the first terminal alert command flag XAale to zero upon stopping acquiring the first terminal alert command signal Sale_A.

When a "Yes" determination is made in step 625, the first terminal control device 12A moves the process forward to step 630 and executes the first terminal alert process. Thus, a notification sound is produced from the first terminal speaker 16A. Next, the first terminal control device 12A moves the process forward to step 695 and temporarily ends the current routine.

On the other hand, when a "No" determination is made in step 625, the first terminal control device 12A moves the process forward to step 645 and ends the first terminal alert process, and then moves the process forward to step 695 and temporarily ends the current routine.

When a "No" determination is made in step 615, the first terminal control device 12A moves the process forward to step 640 and ends the first terminal display process, and then moves the process forward to step 645 and ends the first terminal alert process, and then moves the process forward to step 695 and temporarily ends the current routine.

When a "No" determination is made in step 605, the first terminal control device 12A moves the process forward to step 635 and sets the communication cycle CyA thereof to the first communication cycle Cy1. Specifically, the first terminal control device 12A sets the signal acquisition cycle thereof to the first acquisition cycle Cy1_r and sets the signal transmission cycle thereof to the first transmission cycle Cy1_t.

Next, the first terminal control device 12A moves the process forward to step 640 and ends the first terminal display process, and then moves the process forward to step 645 and ends the first terminal alert process, and then moves the process forward to step 695 and temporarily ends the current routine.

Thus far, the specific operation of the moving body detection system 10 has been described.

Modified Example of First Embodiment

In a case where the driver 10D carries a terminal (hereinafter "second terminal 10B") similar to the first terminal 10A, the moving body detection system 10 may be configured to notify the driver 10D that a moving body MB is present in the blind spot BLD using the second terminal 10B. A moving body detection system 10 according to a modified example of the first embodiment thus configured will be described.

Figure 7:
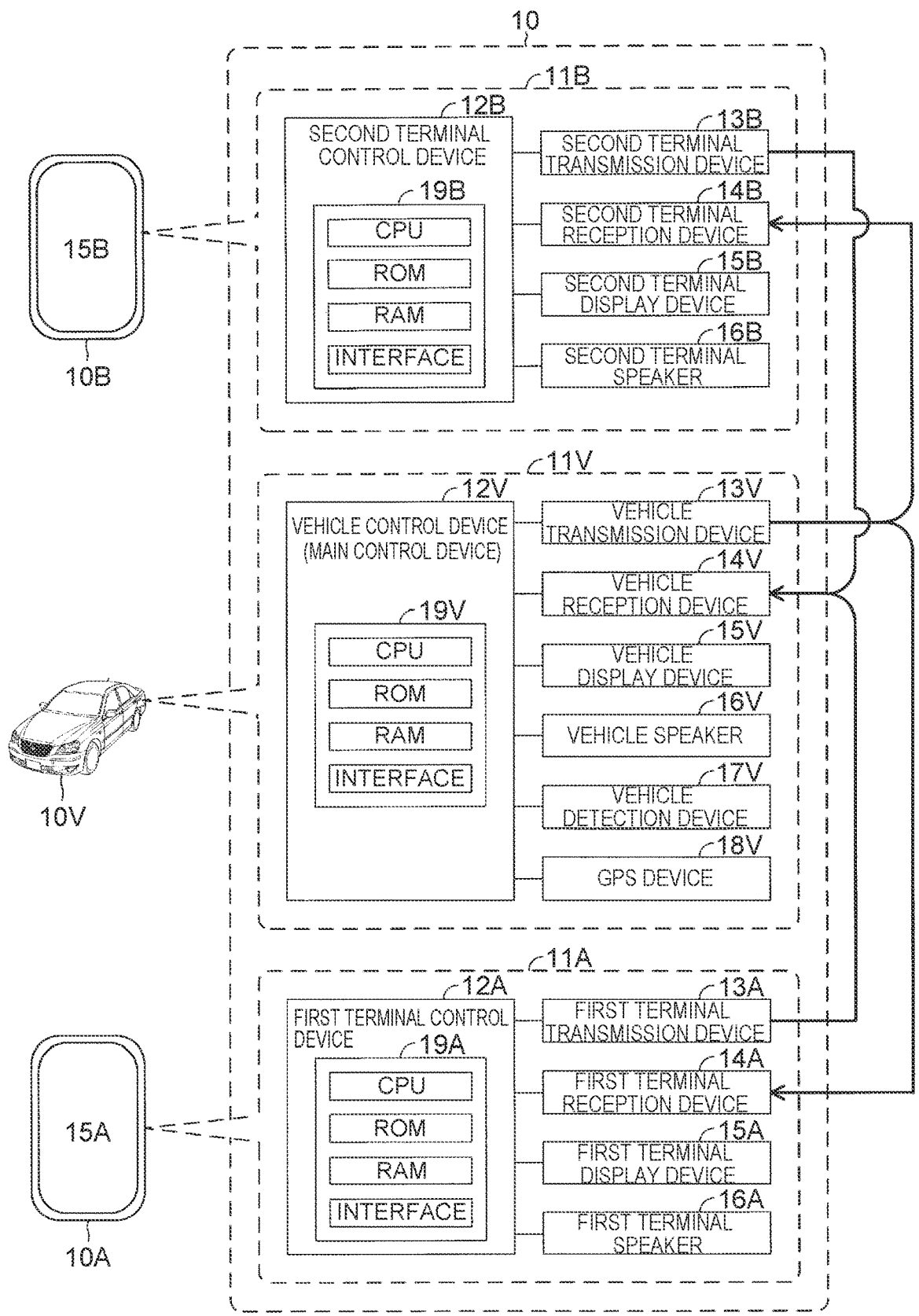
FIG. 7 is a diagram showing a moving body detection system according to a modified example of the first embodiment.

As shown in FIG. 7, this moving body detection system 10 includes a second terminal control system 11B in addition to the vehicle control system 11V and the first terminal control system 11A.

Second Terminal Control System

The second terminal control system 11B includes a second terminal control device 12B, a second terminal transmission device 13B, a second terminal reception device 14B, a second terminal display device 15B, and a second terminal speaker 16B.

Second Terminal Control Device

The second terminal control device 12B is installed in the second terminal 10B. The second terminal 10B is a terminal capable of being carried by a person, and is, for example, a mobile phone terminal or a terminal capable of being worn by a person. In the second embodiment, the second terminal 10B is carried by the driver 10D. The second terminal control device 12B includes an electronic control device (i.e., an ECU) 19B. The ECU 19B of the second terminal 10B includes a CPU, an ROM, an RAM, and an interface.

Second Terminal Transmission Device

The second terminal transmission device 13B is installed in the second terminal 10B. The second terminal transmission device 13B is electrically connected to the second terminal control device 12B. The second terminal control device 12B can transmit radio signals through the second terminal transmission device 13B. Hereinafter, radio signals transmitted by the second terminal control device 12B will be referred to as "second terminal signals SB."

Second Terminal Reception Device

The second terminal reception device 14B is installed in the second terminal 10B. The second terminal reception device 14B is electrically connected to the second terminal control device 12B. The second terminal control device 12B can acquire radio signals through the second terminal reception device 14B.

The second terminal transmission device 13B and the second terminal reception device 14B may be one reception-transmission device having both a function of receiving radio signals and a function of transmitting radio signals.

Second Terminal Display Device

The second terminal display device 15B is installed in the second terminal 10B. The second terminal display device 15B is electrically connected to the second terminal control device 12B. The second terminal control device 12B can display various images on the second terminal display device 15B. The second terminal display device 15B is, for example, a display of the second terminal 10B.

Second Terminal Speaker

The second terminal speaker 16B is installed in the second terminal 10B. The second terminal speaker 16B is electrically connected to the second terminal control device 12B. The second terminal control device 12B can produce various sounds from the second terminal speaker 16B.

As the method of communication between the vehicle transmission device 13V and the second terminal reception device 14B, the moving body detection system 10 according to the modified example of the first embodiment adopts a direct communication method by which the two devices wirelessly and directly communicate with each other, but a cloud-based communication method may instead be adopted.

In this example, the second terminal control device 12B is configured to execute processes relating to the operation of the second terminal control device 12B, such as a signal transmission process and a signal acquisition process, even when a dedicated application is not run on the second terminal control device 12B. However, the second terminal control device 12B may be configured to execute these processes only when a dedicated moving body detection application is run on the second terminal control device 12B. The moving body detection application is an application that is installed on the second terminal control device 12B beforehand and that is started by a person carrying the second terminal 10B to use the second terminal 10B as part of the moving body detection system 10.

Operation of Moving Body Detection System According to Modified Example of First Embodiment Next, the operation of the moving body detection system 10 according to the modified example of the first embodiment will be described.

While the blind-spot condition meeting signal Sbld is not acquired, the second terminal control device 12B is executing a signal transmission process for transmitting radio signals on the first transmission cycle $Cy1\_t$ and executing a signal acquisition process for acquiring radio signals on the first acquisition cycle $Cy1\_r$.

When the second terminal signal SB reaches the vehicle reception device 14V, the vehicle control device 12V acquires this second terminal signal SB. The vehicle control device 12V determines whether the second terminal 10B is present inside the host vehicle 10V based on information on the position of the second terminal 10B indicated by the second terminal signal SB. When it is determined that the second terminal 10B is present inside the host vehicle 10V, the vehicle control device 12V recognizes the second terminal 10B as a terminal that can be used as part of the moving body detection system 10.

On the other hand, upon acquiring the first terminal signal SA, the vehicle control device 12V acquires information on the position of the first terminal 10A indicated by the first terminal signal SA, and specifies the blind spot BLD. When it is determined that the first terminal 10A is present in the blind spot BLD based on the information on the position of the first terminal 10A and the blind spot BLD, the vehicle control device 12V determines that the blind-spot condition Cbld is met. In other words, the vehicle control device 12V determines that a moving body MB is present in the blind spot BLD.

Upon determining that the blind-spot condition Cbld is met, the vehicle control device 12V changes the signal acquisition cycle from the first acquisition cycle $Cy1\_r$ to the second acquisition cycle $Cy2\_r$.

Further, upon determining that the blind-spot condition Cbld is met, the vehicle control device 12V starts the signal transmission process. Thereafter, the vehicle control device 12V executes the signal transmission process on the second transmission cycle $Cy2\_t$ until determining that the blind-spot condition Cbld is not met.

The vehicle control device 12V transmits the blind-spot condition meeting signal Sbld by the signal transmission process.

Upon acquiring the blind-spot condition meeting signal Sbld, the first terminal control device 12A changes the signal transmission cycle from the first transmission cycle $Cy1\_t$ to the second transmission cycle $Cy2\_t$ and changes the signal acquisition cycle from the first acquisition cycle $Cy1\_r$ to the second acquisition cycle $Cy2\_r$.

Upon acquiring the blind-spot condition meeting signal Sbld, the second terminal control device 12B changes the signal transmission cycle from the first transmission cycle $Cy1\_t$ to the second transmission cycle $Cy2\_t$ and changes the signal acquisition cycle from the first acquisition cycle $Cy1\_r$ to the second acquisition cycle $Cy2\_r$.

Therefore, the second terminal control device 12B executes the signal transmission process on the second transmission cycle $Cy2\_t$ and executes the signal acquisition process on the second acquisition cycle $Cy2\_r$ after acquiring the blind-spot condition meeting signal Sbld until stopping acquiring the blind-spot condition meeting signal Sbld.

Upon determining that the blind-spot condition Cbld is met, the vehicle control device 12V determines whether the first notification condition C1 is met. When the calculated likelihood-of-collision value Vc is equal to or larger than the first calculated value Vc_1, the vehicle control device 12V determines that the first notification condition C1 is met.

Upon determining that the first notification condition C1 is met, the vehicle control device 12V executes the vehicle display process to thereby notify the driver 10D that a moving body MB is present in the blind spot BLD.

Further, upon determining that the first notification condition C1 is met, the vehicle control device 12V transmits the first terminal display command signal Sdis_A.

Upon acquiring the first terminal display command signal Sdis_A, the first terminal control device 12A executes the first terminal display process to thereby notify the person carrying the first terminal 10A that a moving body MB is present in the blind spot BLD.

Further, upon determining that the first notification condition C1 is met, the vehicle control device 12V transmits a second terminal display command signal Sdis_B. The second terminal display command signal Sdis_B is a vehicle signal SV indicating the second terminal display command.

Upon acquiring the second terminal display command signal Sdis_B, the second terminal control device 12B notifies the person carrying the second terminal 10B (in the case of this example, the driver 10D) that a moving body MB is present in the blind spot BLD. More specifically, upon acquiring the second terminal display command signal Sdis_B, the second terminal control device 12B executes the second terminal display process to thereby notify the person carrying the second terminal 10B that a moving body MB is present in the blind spot BLD. The second terminal display process is a process of displaying a notification image on the second terminal display device 15B. The notification image displayed on the second terminal display device 15B may be any image that allows the person carrying the second terminal 10B to recognize that a moving body MB is present in the blind spot BLD.

For example, when the second terminal display device 15B is a display of the second terminal 10B, the second terminal control device 12B displays a notification image on the display of the second terminal 10B by the second terminal display process.

Thus, the person carrying the second terminal 10B (in the case of this example, the driver 10D) can learn that a moving body MB (e.g., a pedestrian) is present in the blind spot BLD.

Further, upon determining that the first notification condition C1 is met, the vehicle control device 12V determines whether the second notification condition C2 is met. When the calculated likelihood-of-collision value Vc is equal to or larger than the predetermined second calculated value Vc_2, the vehicle control device 12V determines that the second notification condition C2 is met.

Upon determining that the second notification condition C2 is met, the vehicle control device 12V executes the vehicle alert process to thereby notify the driver 10D that a moving body MB is present in the blind spot BLD.

Further, upon determining that the second notification condition C2 is met, the vehicle control device 12V transmits the first terminal alert command signal Sale_A.

Upon acquiring the first terminal alert command signal Sale_A, the first terminal control device 12A executes the first terminal alert process to thereby notify the person carrying the first terminal 10A that a moving body MB is present in the blind spot BLD.

Further, upon determining that the second notification condition C2 is met, the vehicle control device 12V transmits a second terminal alert command signal Sale_B. The second terminal alert command signal Sale_B is a vehicle signal SV indicating a second terminal alert command.

Upon acquiring the second terminal alert command signal Sale_B, the second terminal control device 12B notifies the person carrying the second terminal 10B (in the case of this example, the driver 10D) that a moving body MB (e.g., a pedestrian) is present in the blind spot BLD. More specifically, upon acquiring the second terminal alert command signal Sale_B, the second terminal control device 12B executes a second terminal alert process to thereby notify the person carrying the second terminal 10B that a moving body MB is present in the blind spot BLD. The second terminal alert process is a process of producing a notification sound from the second terminal speaker 16B. The notification sound produced from the second terminal speaker 16B may be a monotonous alert sound or a human voice (announcement).

Thus, the person carrying the second terminal 10B (in the case of this example, the driver 10D) can learn that a moving body MB (e.g., a pedestrian) is present in the blind spot BLD.

The vehicle control device 12V may be configured to transmit a vehicle signal SV indicating the calculated likelihood-of-collision value Vc, instead of transmitting the second terminal display command signal Sdis_B and the second terminal alert command signal Sale_B. In this case, the second terminal control device 12B acquires this vehicle signal SV and acquires the calculated likelihood-of-collision value Vc indicated by the vehicle signal SV. The second terminal control device 12B executes the second terminal display process when the calculated likelihood-of-collision value Vc is equal to or larger than the first calculated value Vc_1, and executes the second terminal alert process when the calculated likelihood-of-collision value Vc is equal to or larger than the second calculated value Vc_2.

When the second terminal display command signal Sdis_B is acquired for a plurality of moving bodies MB present in the same blind spot BLD, the second terminal control device 12B executes the second terminal display process only once for that blind spot BLD. Similarly, when the second terminal alert command signal Sale_B is acquired for a plurality of moving bodies MB present in the same blind spot BLD, the second terminal control device 12B executes the second terminal alert process only once for that blind spot BLD.

When the second terminal display command signal is acquired for a plurality of moving bodies MB present in different blind spots BLD, the second terminal control device 12B executes the second terminal display process for only the closest moving body MB. Similarly, when the second terminal alert command signal is acquired for a plurality of moving bodies MB present in different blind spots BLD, the second terminal control device 12B executes the second terminal alert process only once.

Thus far, the operation of the moving body detection system 10 according to the modified example of the first embodiment has been described. This moving body detection system 10 can notify the driver 10D that a moving body MB is present in the blind spot BLD using the second terminal 10B.

Specific Operation of Moving Body Detection System According to Modified Example of First Embodiment Next, the specific operation of the moving body detection system 10 according to the modified example of the first embodiment will be described.

Routine of Vehicle Control Device

Figure 8:
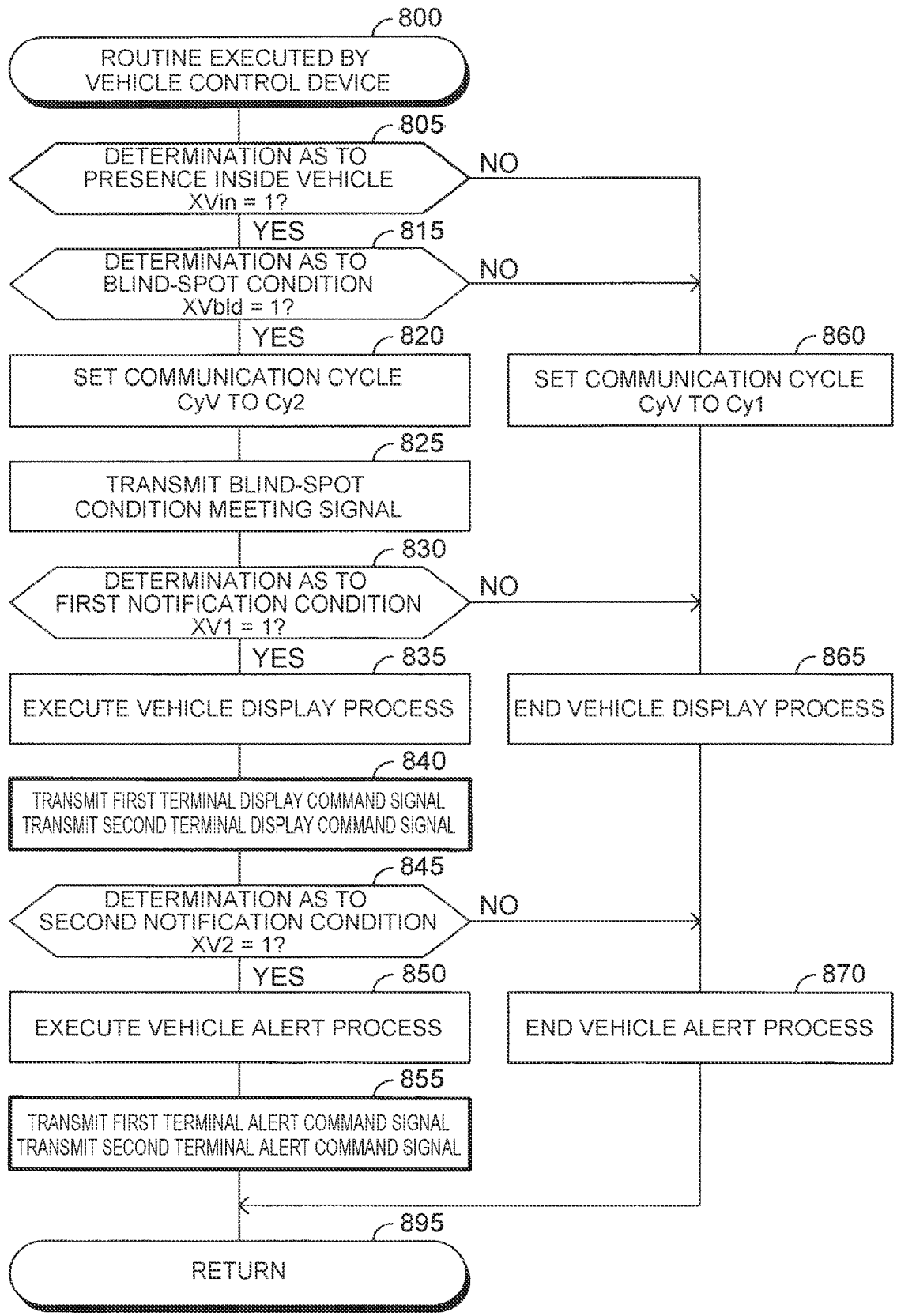
FIG. 8 is a view showing a flowchart of a routine executed by a vehicle control device according to the modified example of the first embodiment.

The vehicle control device 12V of the moving body detection system 10 is configured to execute the routine shown in FIG. 8 each time a predetermined time has elapsed.

The process from step 815 to step 870 of the routine shown in FIG. 8 is the same as the process from step 515 to step 570 of the routine shown in FIG. 5, except that the process of step 805 is added and that the process in step 840 and step 855 is partially changed.

At a predetermined timing, the vehicle control device 12V starts a process from step 800 of FIG. 8, and moves the process forward to step 805, where the vehicle control device 12V determines whether the value of a vehicle inside determination flag XVin is one. The vehicle inside determination flag XVin is a flag indicating whether the second terminal 10B is present inside the host vehicle 10V.

The vehicle control device 12V sets the value of the vehicle inside determination flag XVin to one upon determining that the second terminal 10B is present inside the host vehicle 10V, and the vehicle control device 12V sets the value of the vehicle inside determination flag XVin to zero upon determining that the second terminal 10B is not present inside the host vehicle 10V.

When a "Yes" determination is made in step 805, the vehicle control device 12V moves the process forward to step 815. On the other hand, when a "No" determination is made in step 805, the vehicle control device 12V moves the process forward to step 860.

When the process is moved forward to step 840, the vehicle control device 12V transmits the first terminal display command signal Sdis_A and the second terminal display command signal Sdis_B. When the process is moved forward to step 855, the vehicle control device 12V transmits the first terminal alert command signal Sale_A and the second terminal alert command signal Sale_B.

Routine of First Terminal Control Device

Further, the first terminal control device 12A according to the modified example of the first embodiment is configured to execute the routine shown in FIG. 6, which has been described earlier, each time a predetermined time has elapsed.

Routine of Second Terminal Control Device

Figure 9:
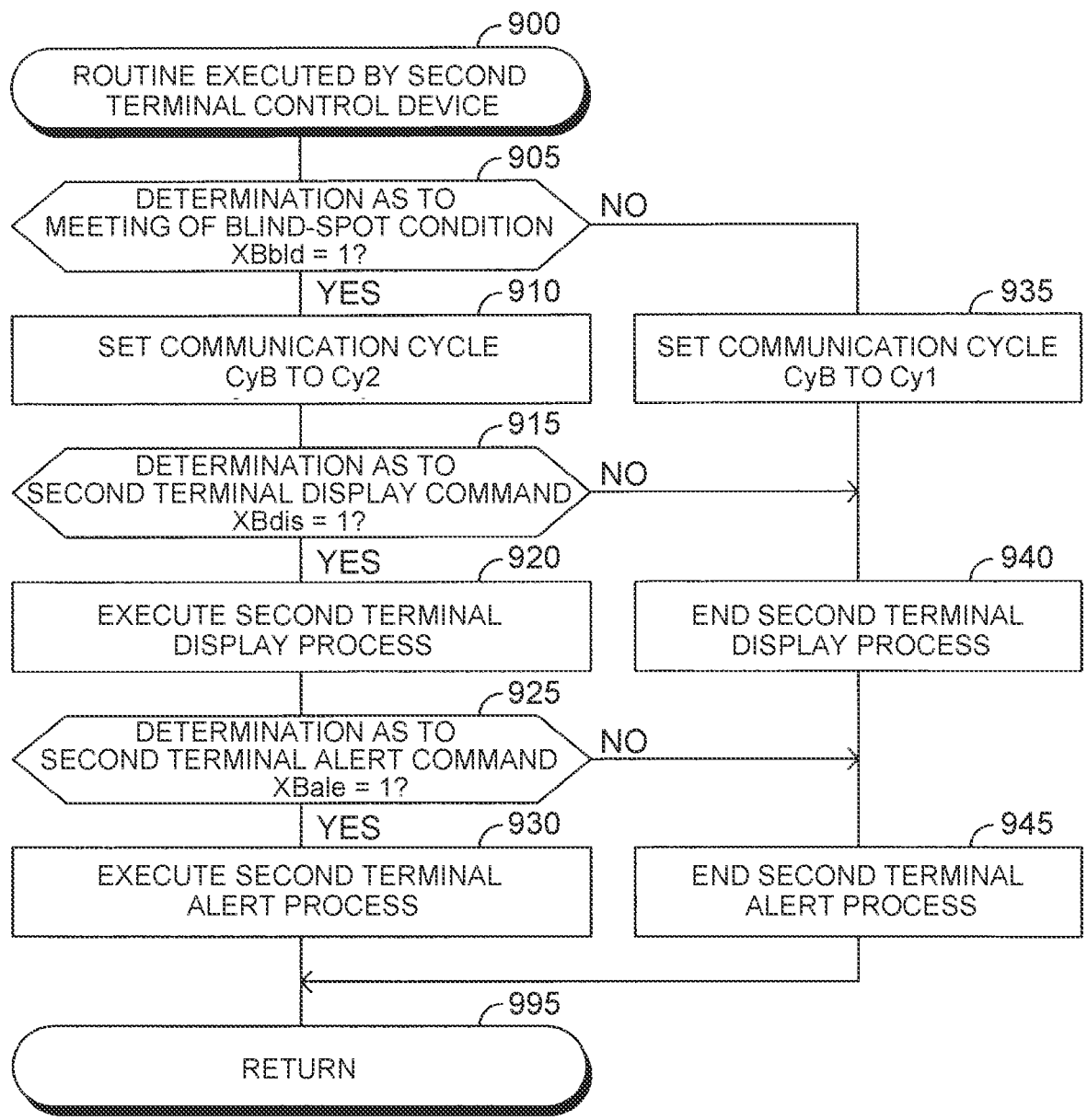
FIG. 9 is a view showing a flowchart of a routine executed by a second terminal control device according to the modified example of the first embodiment.

Further, the second terminal control device 12B according to the modified example of the first embodiment is configured to execute the routine shown in FIG. 9 each time a predetermined time has elapsed.

Therefore, at a predetermined timing, the second terminal control device 12B starts a process from step 900 of FIG. 9, and moves the process forward to step 905, where the second terminal control device 12B determines whether the value of a blind-spot condition meeting flag XBbld is one. The blind-spot condition meeting flag XBbld is a flag indicating whether the blind-spot condition Cbld is met.

The second terminal control device 12B sets the value of the blind-spot condition meeting flag XBbld to one upon acquiring the blind-spot condition meeting signal Sbld, and the second terminal control device 12B sets the value of the blind-spot condition meeting flag XBbld to zero upon stopping acquiring the blind-spot condition meeting signal Sbld.

When a "Yes" determination is made in step 905, the second terminal control device 12B moves the process forward to step 910 and sets a communication cycle CyB thereof to a second communication cycle Cy2. Specifically, the second terminal control device 12B sets a signal acquisition cycle thereof to a second acquisition cycle Cy2_r and sets a signal transmission cycle thereof to a second transmission cycle Cy2_t.

Next, the second terminal control device 12B moves the process forward to step 915 and determines whether the value of a second terminal display command flag XBdis is one. The second terminal display command flag XBdis is a flag indicating whether the first notification condition C1 is met.

The second terminal control device 12B sets the value of the second terminal display command flag XBdis to one upon acquiring the second terminal display command signal Sdis_B, and the second terminal control device 12B sets the value of the second terminal display command flag XBdis to zero upon stopping acquiring the second terminal display command signal Sdis_B.

When a "Yes" determination is made in step 915, the second terminal control device 12B moves the process forward to step 920 and executes the second terminal display process. Thus, a notification image is displayed on the second terminal display device 15B.

Next, the second terminal control device 12B moves the process forward to step 925 and determines whether the value of a second terminal alert command flag XBale is one. The second terminal alert command flag XBale is a flag indicating whether the second notification condition C2 is met.

The second terminal control device 12B sets the value of the second terminal alert command flag XBale to one upon acquiring the second terminal alert command signal Sale_B, and the second terminal control device 12B sets the value of the second terminal alert command flag XBale to zero upon stopping acquiring the second terminal alert command signal Sale_B.

When a "Yes" determination is made in step 925, the second terminal control device 12B moves the process forward to step 930 and executes the second terminal alert process. Thus, a notification sound is produced from the second terminal speaker 16B. Next, the second terminal control device 12B moves the process forward to step 995 and temporarily ends the current routine.

On the other hand, when a "No" determination is made in step 925, the second terminal control device 12B moves the process forward to step 945 and ends the second terminal alert process, and then moves the process forward to step 995 and temporarily ends the current routine.

When a "No" determination is made in step 915, the second terminal control device 12B moves the process forward to step 940 and ends the second terminal display process, and then moves the process forward to step 945 and ends the second terminal alert process, and then moves the process forward to step 995 and temporarily ends the current routine.

When a "No" determination is made in step 905, the second terminal control device 12B moves the process forward to step 935 and sets the communication cycle CyB to a first communication cycle Cy1. Specifically, the second terminal control device 12B sets the signal acquisition cycle thereof to a first acquisition cycle Cy1_r and sets the signal transmission cycle thereof to a first transmission cycle Cy1_t.

Next, the second terminal control device 12B moves the process forward to step 940 and ends the second terminal display process, and then moves the process forward to step 945 and ends the second terminal alert process, and then moves the process forward to step 995 and temporarily ends the current routine.

Thus far, the specific operation of the moving body detection system 10 according to the modified example of the first embodiment has been described.

Second Embodiment

Figure 10:
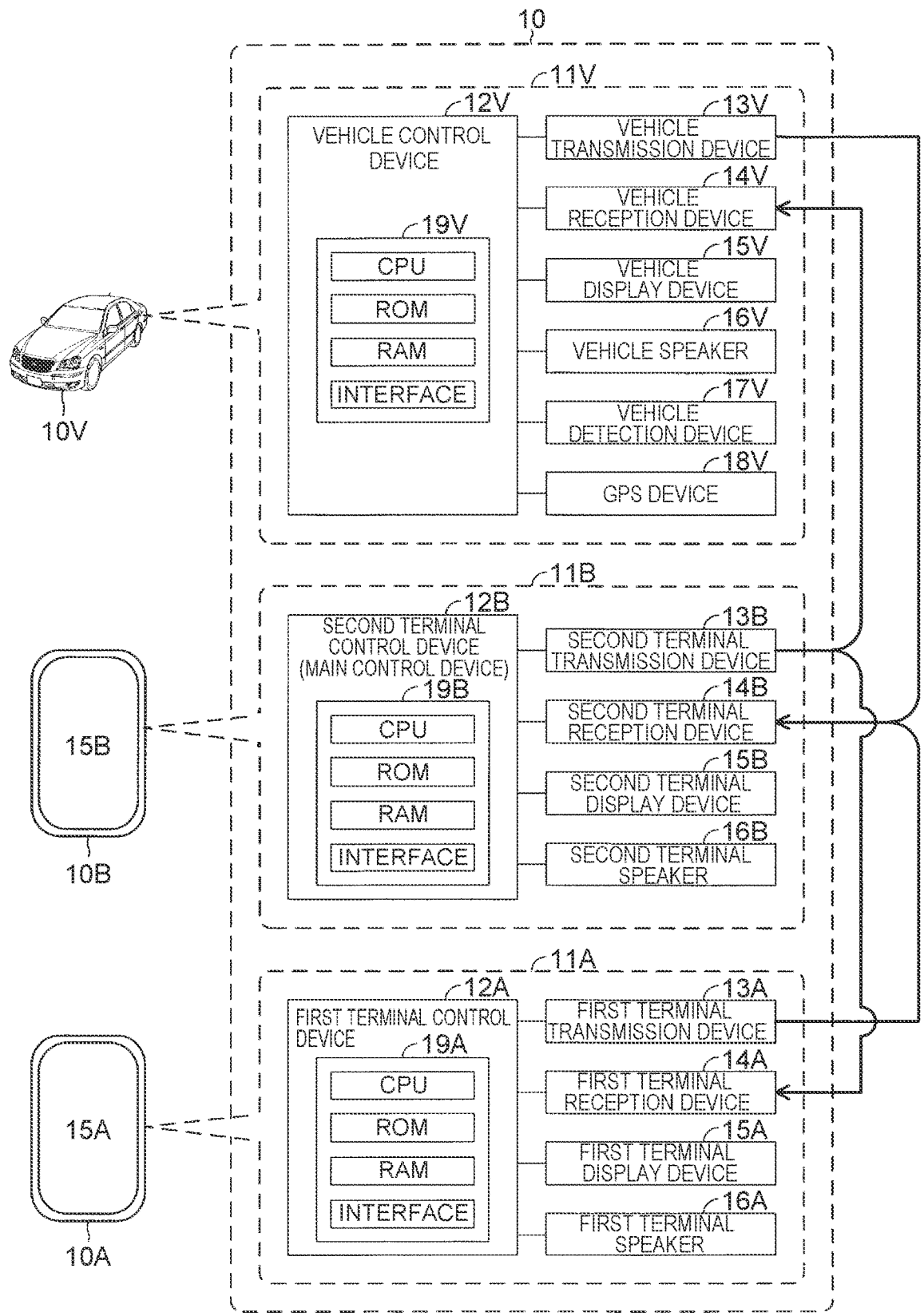
FIG. 10 is a diagram showing a moving body detection system according to a second embodiment of the disclosure.

As shown in FIG. 10, in a case where the moving body detection system 10 includes the second terminal control system 11B in addition to the vehicle control system 11V and the first terminal control system 11A, the moving body detection system 10 may be configured to use the second terminal control device 12B as a main control device. Next, a moving body detection system 10 according to a second embodiment of the disclosure thus configured will be described.

As the method of communication between the first terminal transmission device 13A and the second terminal reception device 14B, the method of communication between the second terminal transmission device 13B and the vehicle reception device 14V, the method of communication between the vehicle transmission device 13V and the second terminal reception device 14B, and the method of communication between the second terminal transmission device 13B and the first terminal reception device 14A, the moving body detection system 10 according to the second embodiment adopts a direct communication method by which the two devices wirelessly and directly communicate with each other, but a cloud-based communication method may instead be adopted.

Operation of Moving Body Detection System According to Second Embodiment

While the blind-spot condition Cbld is not met, the second terminal control device 12B is executing the signal acquisition process for acquiring radio signals on the first acquisition cycle Cy1_r and executing the signal transmission process for transmitting radio signals on the first transmission cycle Cy1_t.

While the blind-spot condition meeting signal Sbld is not acquired, the first terminal control device 12A is executing the signal transmission process for transmitting radio signals on the first transmission cycle Cy1_t and executing the signal acquisition process for acquiring radio signals on the first acquisition cycle Cy1_r.

While the blind-spot condition meeting signal Sbld is not acquired, the vehicle control device 12V is executing the signal acquisition process for acquiring radio signals on the first acquisition cycle Cy1_r.

When the second terminal signal SB reaches the vehicle reception device 14V, the vehicle control device 12V acquires this second terminal signal SB. Based on the information on the position of the second terminal 10B indicated by the second terminal signal SB, the vehicle control device 12V determines whether the second terminal 10B is present inside the host vehicle 10V. When it is determined that the second terminal 10B is present inside the host vehicle 10V, the vehicle control device 12V transmits a second terminal recognition signal SVid. The second terminal recognition signal SVid is a vehicle signal SV indicating that the second terminal 10B is present inside the host vehicle 10V.

The second terminal control device 12B acquires the second terminal recognition signal SVid.

On the other hand, when the first terminal signal SA reaches the second terminal reception device 14B, the second terminal control device 12B acquires the first terminal signal SA. When the first terminal signal SA is acquired while the second terminal recognition signal SVid is acquired, the second terminal control device 12B transmits a blind-spot information requesting signal Sreq_bld. The blind-spot information requesting signal Sreq_bld is a second terminal signal SB requesting the vehicle control device 12V to transmit a blind-spot information signal Sinfo_bld. The blind-spot information signal Sinfo_bld is a vehicle signal SV indicating blind-spot information. The blind-spot information is information on the blind spot BLD.

Upon acquiring the blind-spot information requesting signal Sreq_bld, the vehicle control device 12V starts a signal transmission process for transmitting the blind-spot information signal Sinfo_bld. Thereafter, the vehicle control device 12V executes the signal transmission process on the first transmission cycle Cy1_t until acquiring the blind-spot condition meeting signal Sbld.

Upon acquiring the blind-spot information signal Sinfo_bld, the second terminal control device 12B acquires the blind-spot information indicated by the blind-spot information signal Sinfo_bld. The second terminal control device 12B acquires the first terminal position information indicated by the first terminal signal SA.

Based on the blind-spot information and the first terminal position information, the second terminal control device 12B determines whether the blind-spot condition Cbld is met.

The second terminal control device 12B may be configured to transmit a front-side state detection information requesting signal Sreq_det upon acquiring the first terminal signal SA. The front-side state detection information requesting signal Sreq_det is a second terminal signal SB requesting the vehicle control device 12V to transmit a front-side state detection information signal Sinfo_det. The front-side state detection information signal Sinfo_det is a vehicle signal SV indicating the front-side state detection information. Upon acquiring the front-side state detection information requesting signal Sreq_det, the vehicle control device 12V transmits the front-side state detection information signal Sinfo_det. The second terminal control device 12B acquires the front-side state detection information signal Sinfo_det and obtains the blind spot BLD from the front-side state detection information indicated by the signal, and determines whether the blind-spot condition Cbld is met based on the blind spot BLD and the first terminal position information.

When the second terminal control device 12B determines that the blind-spot condition Cbld is met, the second terminal control device 12B changes the signal acquisition cycle from the first acquisition cycle Cy1_r to the second acquisition cycle Cy2_r, and changes the signal transmission cycle from the first transmission cycle Cy1_t to the second transmission cycle Cy2_t.

Therefore, the second terminal control device 12B executes the signal acquisition process on the second acquisition cycle Cy2_r, and executes the signal transmission process on the second transmission cycle Cy2_t, after determining that the blind-spot condition Cbld is met until determining that the blind-spot condition Cbld is not met.

Further, upon determining that the blind-spot condition Cbld is met, the second terminal control device 12B transmits the blind-spot condition meeting signal Sbld. The blind-spot condition meeting signal Sbld is a second terminal signal SB indicating that the blind-spot condition Cbld is met.

Upon acquiring the blind-spot condition meeting signal Sbld, the first terminal control device 12A and the vehicle control device 12V change the signal transmission cycle from the first transmission cycle Cy1_t to the second transmission cycle Cy2_t and change the signal acquisition cycle from the first acquisition cycle Cy1_r to the second acquisition cycle Cy2_r.

Therefore, the first terminal control device 12A and the vehicle control device 12V execute the signal transmission process on the second transmission cycle Cy2_t, and execute the signal acquisition process on the second acquisition cycle Cy2_r, after acquiring the blind-spot condition meeting signal Sbld until stopping acquiring the blind-spot condition meeting signal Sbld.

Further, upon determining that the blind-spot condition Cbld is met, the second terminal control device 12B determines whether the first notification condition C1 is met. The second terminal control device 12B may be configured to determine that the first notification condition C1 is also met upon determining that the blind-spot condition Cbld is met. In this example, however, the second terminal control device 12B determines that the first notification condition C1 is met when the calculated likelihood-of-collision value Vc becomes equal to or larger than the predetermined first calculated value Vc_1.

The second terminal control device 12B calculates the calculated likelihood-of-collision value Vc by the same method as described above.

Specifically, the second terminal control device 12B acquires a first terminal behavior parameter by analyzing the positions of the first terminal 10A acquired from the first terminal position information in chronological order.

On the other hand, upon acquiring the blind-spot condition meeting signal Sbld, the vehicle control device 12V transmits a host vehicle behavior information signal Sveh. The host vehicle behavior information signal Sveh is a vehicle signal SV indicating host vehicle behavior information. The host vehicle behavior information is information about the host vehicle behavior parameter.

The second terminal control device 12B acquires the host vehicle behavior information signal Sveh, and acquires the host vehicle behavior parameter based on the host vehicle behavior information indicated by the signal Sveh.

Based on the first terminal behavior parameter and the host vehicle behavior parameter, the second terminal control device 12B calculates the calculated likelihood-of-collision value Vc indicating the likelihood of collision between the host vehicle 10V and the person carrying the first terminal 10A.

Upon determining that the first notification condition C1 is met, the second terminal control device 12B notifies the driver 10D that a moving body MB is present in the blind spot BLD. More specifically, upon determining that the first notification condition C1 is met, the second terminal control device 12B executes the second terminal display process to thereby notify the driver 10D that a moving body MB is present in the blind spot BLD.

Thus, the person carrying the second terminal 10B (in this example, the driver 10D) can learn that a moving body MB is present in the blind spot BLD.

The second terminal control device 12B may be configured to transmit a vehicle display command signal Sdis_V upon determining that the first notification condition C1 is met. The vehicle display command signal Sdis_V is a second terminal signal SB indicating a vehicle display command. Upon acquiring the vehicle display command signal Sdis_V, the vehicle control device 12V executes the vehicle display process.

Further, upon determining that the first notification condition C1 is met, the second terminal control device 12B transmits the first terminal display command signal Sdis_A. The first terminal display command signal Sdis_A is a second terminal signal SB indicating the first terminal display command. Upon acquiring the first terminal display command signal Sdis_A, the first terminal control device 12A executes the first terminal display process.

Further, upon determining that the first notification condition C1 is met, the second terminal control device 12B determines whether the second notification condition C2 is met.

The second terminal control device 12B may be configured to determine that the second notification condition C2 is also met upon determining that the first notification condition C1 is met. In this example, however, the second terminal control device 12B determines that the second notification condition C2 is met when the calculated likelihood-of-collision value Vc is equal to or larger than the predetermined second calculated value Vc_2.

Upon determining that the second notification condition C2 is met, the second terminal control device 12B executes the second terminal alert process to thereby notify the driver 10D that a moving body MB is present in the blind spot BLD.

Thus, the driver 10D can learn that a moving body MB (e.g., a pedestrian) is present in the blind spot BLD.

Further, upon determining that the second notification condition C2 is met, the second terminal control device 12B transmits the first terminal alert command signal Sale_A. The first terminal alert command signal Sale_A is a second terminal signal SB indicating the first terminal alert command.

Upon acquiring the first terminal alert command signal Sale_A, the first terminal control device 12A executes the first terminal alert process to thereby notify the person carrying the first terminal 10A that a moving body MB is present in the blind spot BLD.

The second terminal control device 12B may be configured to transmit a vehicle alert command signal Sale_V upon determining that the second notification condition C2 is met. The vehicle alert command signal Sale_V is a second terminal signal SB indicating the vehicle alert command. Upon acquiring the vehicle alert command signal Sale_V, the vehicle control device 12V executes the vehicle alert process.

The second terminal control device 12B may be configured to transmit a second terminal signal SB indicating the calculated likelihood-of-collision value Vc, instead of transmitting the first terminal display command signal Sdis_A and the first terminal alert command signal Sale_A. In this case, the first terminal control device 12A acquires the second terminal signal SB, and acquires the calculated likelihood-of-collision value Vc indicated by the signal SB. The first terminal control device 12A executes the first terminal display process when the calculated likelihood-of-collision value Vc is equal to or larger than the first calculated value Vc_1, and executes the first terminal alert process when the calculated likelihood-of-collision value Vc is equal to or larger than the second calculated value Vc_2.

When the first notification condition C1 is met for a plurality of moving bodies MB present in the same blind spot BLD, the second terminal control device 12B executes the second terminal display process only once for that blind spot BLD. Similarly, when the second notification condition C2 is met for a plurality of moving bodies MB present in the same blind spot BLD, the second terminal control device 12B executes the second terminal alert process only once for that blind spot BLD.

When the first notification condition C1 is met for a plurality of moving bodies MB present in different blind spots BLD, the second terminal control device 12B executes the second terminal display process only for the closest moving body MB. Similarly, when the second notification condition C2 is met for a plurality of moving bodies MB present in different blind spots BLD, the second terminal control device 12B executes the second terminal alert process only once.

When the vehicle display command signal is acquired for a plurality of moving bodies MB present in the same blind spot BLD, the vehicle control device 12V may display only one moving body MB, or more than one moving body MB (particularly, all the moving bodies MB), by the vehicle display process for that blind spot BLD. When the vehicle alert command signal is acquired for a plurality of moving bodies MB present in the same blind spot BLD, the vehicle control device 12V may execute the second terminal alert process only once, or more than once (particularly, the number of times equal to the number of the moving bodies MB), for that blind spot BLD.

When the vehicle display command signal is acquired for a plurality of moving bodies MB present in different blind spots BLD, the vehicle control device 12V may display an image of only the closest moving body MB, or images of more than one moving body MB (particularly, all the moving bodies MB), by the vehicle display process. When the vehicle alert command signal is acquired for a plurality of moving bodies MB present in different blind spots BLD, the vehicle control device 12V may execute the vehicle alert process only once, or more than once (particularly, the number of times equal to the number of the moving bodies MB).

Thus far, the operation of the moving body detection system 10 according to the second embodiment has been described. In this moving body detection system 10, the cycle of communication between the second terminal control device 12B and the first terminal control device 12A and the cycle of communication between the second terminal control device 12B and the vehicle control device 12V are set to a longer cycle when the blind-spot condition Cbld is not met and set to a shorter cycle when the blind-spot condition Cbld is met. This makes it possible to accurately track the behavior of a moving body MB present in the blind spot BLD while curbing electric power consumption of the battery of the second terminal 10B, the battery of the first terminal 10A, and the battery of the host vehicle 10V.

Specific Operation of Moving Body Detection System According to Second Embodiment Next, the specific operation of the moving body detection system 10 according to the second embodiment will be described.

Routine of Second Terminal Control Device

Figure 11:
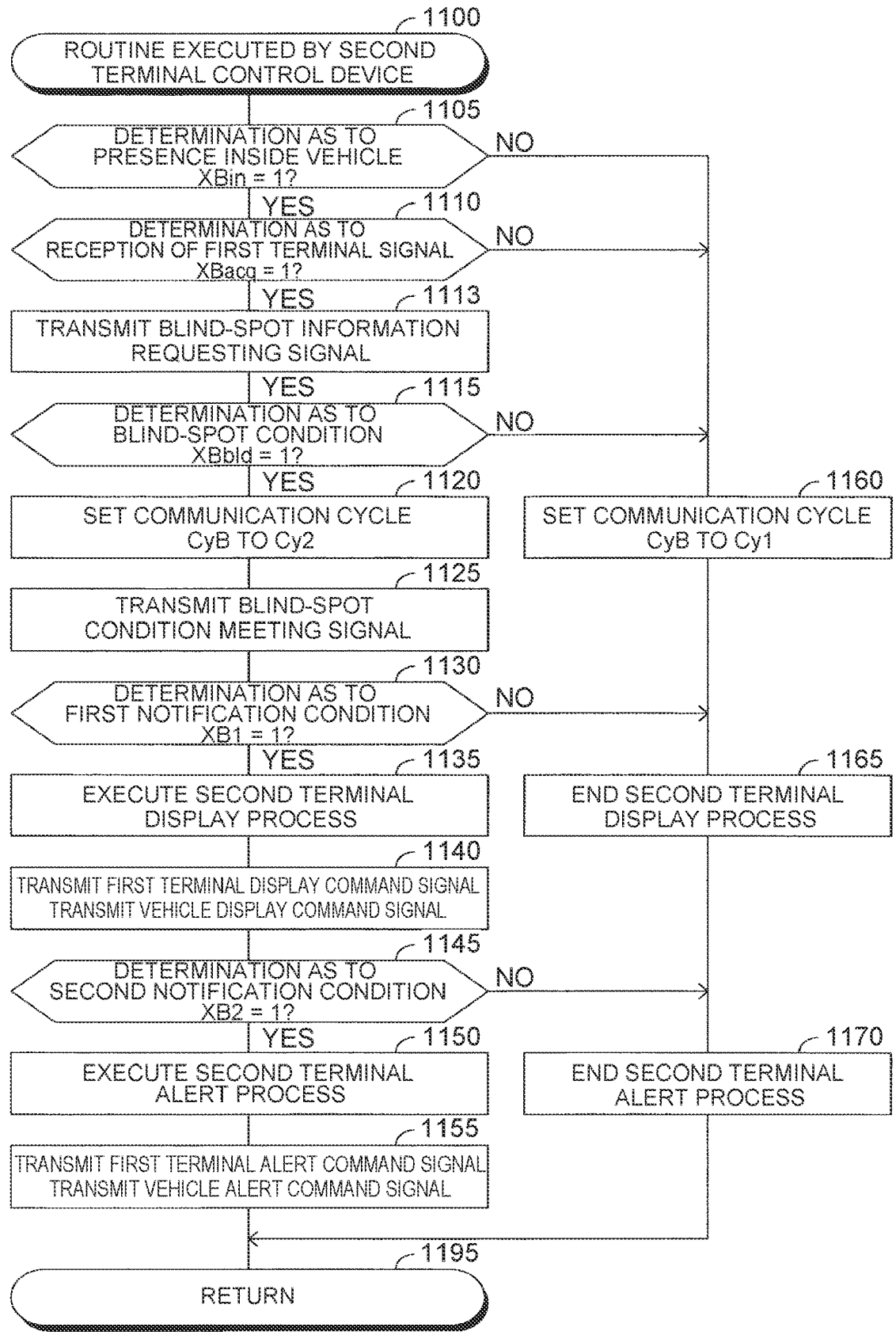
FIG. 11 is a view showing a flowchart of a routine executed by a second terminal control device according to the second embodiment.

The second terminal control device 12B of the moving body detection system 10 is configured to execute the routine shown in FIG. 11 each time a predetermined time has elapsed.

Therefore, at a predetermined timing, the second terminal control device 12B starts a process from step 1100 of FIG. 11, and moves the process forward to step 1105, where the second terminal control device 12B determines whether the value of a vehicle inside determination flag XBin is one. The vehicle inside determination flag XBin is a flag indicating whether the second terminal 10B is present inside the host vehicle 10V.

The second terminal control device 12B sets the value of the vehicle inside determination flag XBin to one upon determining that the second terminal 10B is present inside the host vehicle 10V, and the second terminal control device 12B sets the value of the vehicle inside determination flag XBin to zero upon determining that the second terminal 10B is not present inside the host vehicle 10V.

When a "Yes" determination is made in step 1105, the second terminal control device 12B moves the process forward to step 1110 and determines whether the value of a first terminal signal acquisition flag XBacq is one. The first terminal signal acquisition flag XBacq is a flag indicating whether the second terminal control device 12B is acquiring the first terminal signal SA.

The second terminal control device 12B sets the value of the first terminal signal acquisition flag XBacq to one upon acquiring the first terminal signal SA, and the second terminal control device 12B sets the value of the first terminal signal acquisition flag XBacq to zero upon stopping acquiring the first terminal signal SA.

When a "Yes" determination is made in step 1110, the second terminal control device 12B moves the process forward to step 1113 and transmits the blind-spot information requesting signal Sreq_bld.

Next, the second terminal control device 12B moves the process forward to step 1115 and determines whether the value of the blind-spot condition meeting flag XBbld is one. The blind-spot condition meeting flag XBbld is a flag indicating whether the blind-spot condition Cbld is met.

The value of the blind-spot condition meeting flag XBbld is set to one by the second terminal control device 12B when the blind-spot condition Cbld is met, and is set to zero by the second terminal control device 12B when the blind-spot condition Cbld is no longer met.

When a "Yes" determination is made in step 1115, the second terminal control device 12B moves the process forward to step 1120 and sets the communication cycle CyB thereof to the second communication cycle Cy2. Specifically, the second terminal control device 12B sets the signal acquisition cycle thereof to the second acquisition cycle Cy2_r and sets the signal transmission signal thereof to the second transmission cycle Cy2_t.

Next, the second terminal control device 12B moves the process forward to step 1125 and transmits the blind-spot condition meeting signal Sbld.

Next, the second terminal control device 12B moves the process forward to step 1130 and determines whether the value of a first notification condition meeting flag XB1 is one. The first notification condition meeting flag XB1 is a flag indicating whether the first notification condition C1 is met.

The value of the first notification condition meeting flag XB1 is set to one by the second terminal control device 12B when the first notification condition C1 is met, and is set to zero by the second terminal control device 12B when the first notification condition C1 is no longer met.

When a "Yes" determination is made in step 1130, the second terminal control device 12B moves the process forward to step 1135 and executes the second terminal display process. Thus, a notification image is displayed on the second terminal display device 15B. Next, the second terminal control device 12B moves the process forward to step 1140 and transmits the first terminal display command signal Sdis_A and the vehicle display command signal Sdis_V.

Next, the second terminal control device 12B moves the process forward to step 1145 and determines whether the value of a second notification condition meeting flag XB2 is one. The second notification condition meeting flag XB2 is a flag indicating whether the second notification condition C2 is met.

The value of the second notification condition meeting flag XB2 is set to one by the second terminal control device 12B when the second notification condition C2 is met, and is set to zero by the second terminal control device 12B when the second notification condition C2 is no longer met.

When a "Yes" determination is made in step 1145, the second terminal control device 12B moves the process forward to step 1150 and executes the second terminal alert process. Thus, a notification sound is produced from the second terminal speaker 16B. Next, the second terminal control device 12B moves the process forward to step 1155 and transmits the first terminal alert command signal Sale_A and the vehicle alert command signal Sale_V, and then moves the process forward to step 1195 and temporarily ends the current routine.

On the other hand, when a "No" determination is made in step 1145, the second terminal control device 12B moves the process forward to step 1170 and ends the second terminal alert process, and then moves the process forward to step 1195 and temporarily ends the current routine.

When a "No" determination is made in step 1130, the second terminal control device 12B moves the process forward to step 1165 and ends the second terminal display process, and then moves the process forward to step 1170 and ends the second terminal alert process, and then moves the process forward to step 1195 and temporarily ends the current routine.

When a "No" determination is made in step 1105, step 1110, or step 1115, the second terminal control device 12B moves the process forward to step 1160 and sets the communication cycle CyB thereof to the first communication cycle Cy1. Specifically, the second terminal control device 12B sets the signal acquisition cycle thereof to the first acquisition cycle Cy1_r and sets the signal transmission cycle thereof to the first transmission cycle Cy1_t.

Next, the second terminal control device 12B moves the process forward to step 1165 and ends the second terminal display process, and then moves the process forward to step 1170 and ends the second terminal alert process, and then moves the process forward to step 1195 and temporarily ends the current routine.

Routine of First Terminal Control Device

Figure 12:
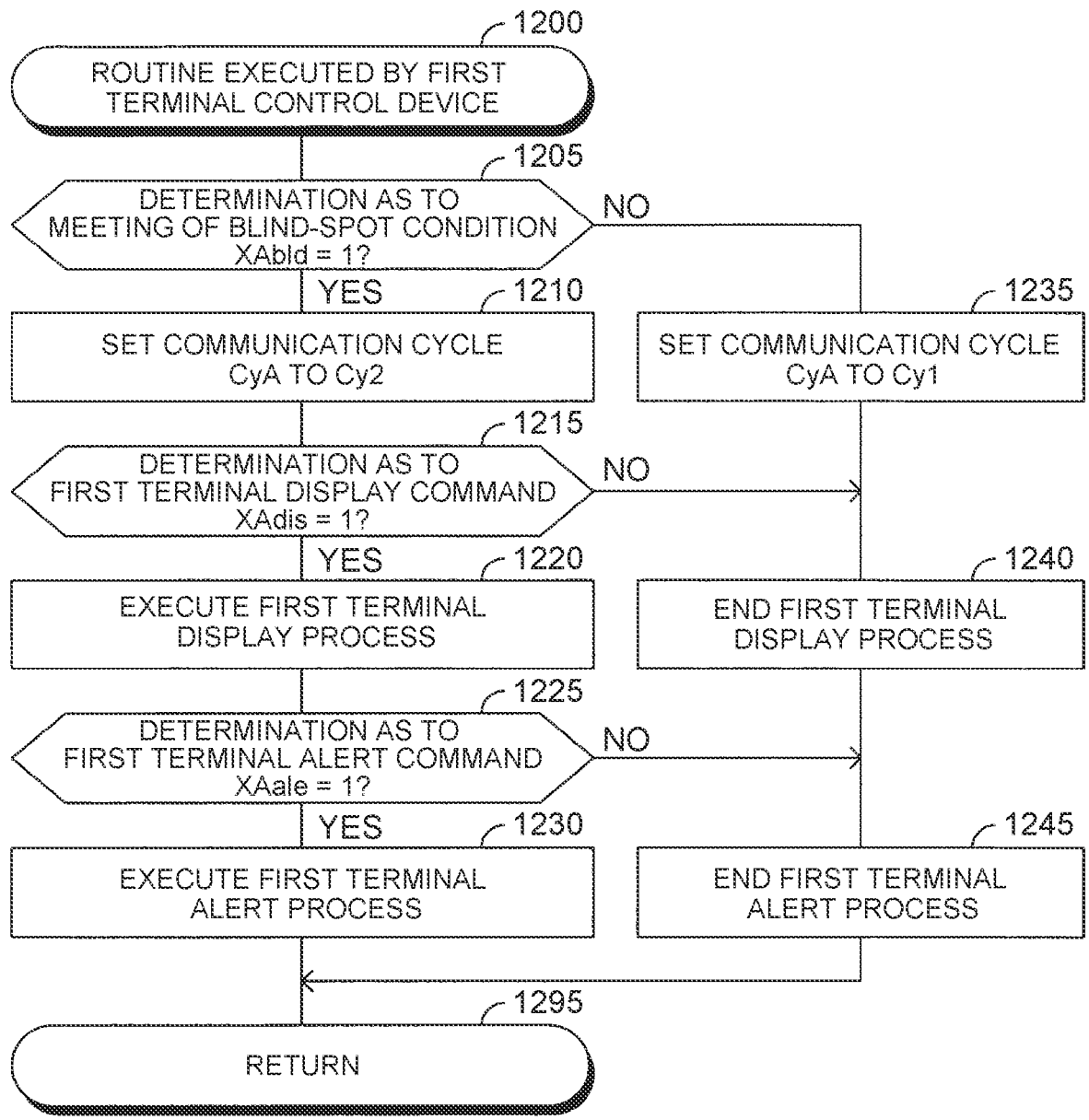
FIG. 12 is a view showing a flowchart of a routine executed by a first terminal control device according to the second embodiment.

The first terminal control device 12A according to the second embodiment is configured to execute the routine shown in FIG. 12 each time a predetermined time has elapsed.

Therefore, at a predetermined timing, the first terminal control device 12A starts a process from step 1200 of FIG. 12, and moves the process forward to step 1205, where the first terminal control device 12A determines whether the value of the blind-spot condition meeting flag XAbld is one. The blind-spot condition meeting flag XAbld is the same flag as the blind-spot condition meeting flag XAbld according to the first embodiment.

When a "Yes" determination is made in step 1205, the first terminal control device 12A moves the process forward to step 1210 and sets the communication cycle CyA thereof to the second communication cycle Cy2. Specifically, the first terminal control device 12A sets the signal acquisition cycle thereof to the second acquisition cycle Cy2_r and sets the signal transmission cycle thereof to the second transmission cycle Cy2_t.

Next, the first terminal control device 12A moves the process forward to step 1215 and determines whether the value of the first terminal display command flag XAdis is one. The first terminal display command flag XAdis is the same flag as the first terminal display command flag XAdis according to the first embodiment.

When a "Yes" determination is made in step 1215, the first terminal control device 12A moves the process forward to step 1220 and executes the first terminal display process. Thus, a notification image is displayed on the first terminal display device 15A.

Next, the first terminal control device 12A moves the process forward to step 1225 and determines whether the value of the first terminal alert command flag XAale is one. The first terminal alert command flag XAale is the same flag as the first terminal alert command flag XAale according to the first embodiment.

When a "Yes" determination is made in step 1225, the first terminal control device 12A moves the process forward to step 1230 and executes the first terminal alert process. Thus, a notification sound is produced from the first terminal speaker 16A. Next, the first terminal control device 12A moves the process forward to step 1295 and temporarily ends the current routine.

On the other hand, when a "No" determination is made in step 1225, the first terminal control device 12A moves the process forward to step 1245 and ends the first terminal alert process, and then moves the process forward to step 1295 and temporarily ends the current routine.

When a "No" determination is made in step 1215, the first terminal control device 12A moves the process forward to step 1240 and ends the first terminal display process, and then moves the process forward to step 1245 and ends the first terminal alert process, and then moves the process forward to step 1295 and temporarily ends the current routine.

When a "No" determination is made in step 1205, the first terminal control device 12A moves the process forward to step 1235 and sets the communication cycle CyA thereof to the first communication cycle Cy1. Specifically, the first terminal control device 12A sets the signal acquisition cycle thereof to the first acquisition cycle Cy1_r and sets the signal transmission cycle thereof to the first transmission cycle Cy1_t.

Next, the first terminal control device 12A moves the process forward to step 1240 and ends the first terminal display process, and then moves the process forward to step 1245 and ends the first terminal alert process, and then moves the process forward to step 1295 and temporarily ends the current routine.

Routine of Vehicle Control Device

Figure 13:
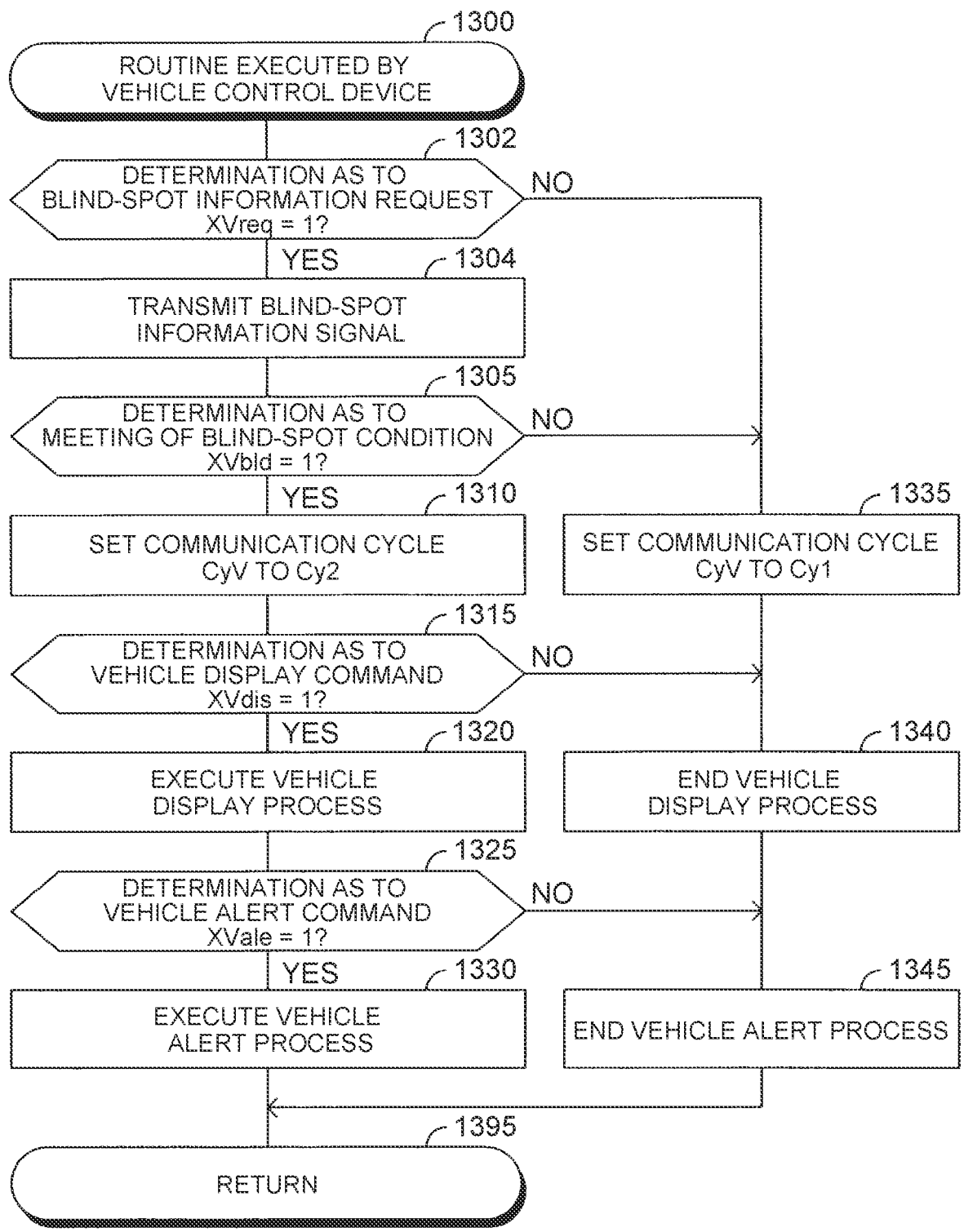
FIG. 13 is a view showing a flowchart of a routine executed by a vehicle control device according to the second embodiment.

The vehicle control device 12V according to the second embodiment is configured to execute the routine shown in FIG. 13 each time a predetermined time has elapsed.

Therefore, at a predetermined timing, the vehicle control device 12V starts a process from step 1300 of FIG. 13, and moves the process forward to step 1302, where the vehicle control device 12V determines whether the value of a blind-spot information requesting flag XVreq is one. The blind-spot information requesting flag XVreq is a flag indicating whether the second terminal control device 12B is requesting transmission of the blind-spot information signal Sinfo_bld.

The vehicle control device 12V sets the value of the blind-spot information requesting flag XVreq to one upon acquiring the blind-spot information requesting signal Sreq_bld, and the vehicle control device 12V sets the value of the blind-spot information requesting flag XVreq to zero upon stopping acquiring the blind-spot information requesting signal Sreq_bld.

When a "Yes" determination is made in step 1302, the vehicle control device 12V moves the process forward to step 1304 and transmits the blind-spot information signal Sinfo_bld.

Next, the vehicle control device 12V moves the process forward to step 1305 and determines whether the value of the blind-spot condition meeting flag XVbld is one. The blind-spot condition meeting flag XVbld is a flag indicating whether the blind-spot condition Cbld is met.

The vehicle control device 12V sets the value of the blind-spot condition meeting flag XVbld to one upon acquiring the blind-spot condition meeting signal Sbld, and the vehicle control device 12V sets the value of the blind-spot condition meeting flag XVbld to zero upon stopping acquiring the blind-spot condition meeting signal Sbld.

When a "Yes" determination is made in step 1305, the vehicle control device 12V moves the process forward to step 1310 and sets the communication cycle CyV thereof to the second communication cycle Cy2. Specifically, the vehicle control device 12V sets the signal acquisition cycle thereof to the second acquisition cycle Cy2_r and sets the signal transmission cycle thereof to the second transmission cycle Cy2_t.

Next, the vehicle control device 12V moves the process forward to step 1315 and determines whether the value of a vehicle display command flag XVdis is one. The vehicle display command flag XVdis is a flag indicating whether the first notification condition C1 is met.

The vehicle control device 12V sets the value of the vehicle display command flag XVdis to one upon acquiring the vehicle display command signal Sdis_V, and the vehicle control device 12V sets the value of the vehicle display command flag XVdis to zero upon stopping acquiring the vehicle display command signal Sdis_V.

When a "Yes" determination is made in step 1315, the vehicle control device 12V moves the process forward to step 1320 and executes the vehicle display process. Thus, a notification image is displayed on the vehicle display device 15V.

Next, the vehicle control device 12V moves the process forward to step 1325 and determines whether the value of a vehicle alert command flag XVale is one. The vehicle alert command flag XVale is a flag indicating whether the second notification condition C2 is met.

The vehicle control device 12V sets the value of the vehicle alert command flag XVale to one upon acquiring the vehicle alert command signal Sale_V, and the vehicle control device 12V sets the value of the vehicle alert command flag XVale to zero upon stopping acquiring the vehicle alert command signal Sale_V.

When a "Yes" determination is made in step 1325, the vehicle control device 12V moves the process forward to step 1330 and executes the vehicle alert process. Thus, a notification sound is produced from the vehicle speaker 16V. Next, the vehicle control device 12V moves the process forward to step 1395 and temporarily ends the current routine.

On the other hand, when a "No" determination is made in step 1325, the vehicle control device 12V moves the process forward to step 1345 and ends the vehicle alert process, and then moves the process forward to step 1395 and temporarily ends the current routine.

When a "No" determination is made in step 1320, the vehicle control device 12V moves the process forward to step 1340 and ends the vehicle display process. Next, the vehicle control device 12V moves the process forward to step 1345 and ends the vehicle alert process, and then moves the process forward to step 1395 and temporarily ends the current routine.

When a "No" determination is made in step 1305 or step 1302, the vehicle control device 12V moves the process forward to step 1335 and sets the communication cycle CyV thereof to the first communication cycle Cy1. Specifically, the vehicle control device 12V sets the signal acquisition cycle thereof to the first acquisition cycle Cy1_r and sets the signal transmission cycle thereof to the first transmission cycle Cy1_t.

Next, the vehicle control device 12V moves the process forward to step 1340 and ends the vehicle display process, and then moves the process forward to step 1345 and ends the vehicle alert process, and then moves the process forward to step 1395 and temporarily ends the current routine.

Thus far, the specific operation of the moving body detection system 10 according to the second embodiment has been described.

The disclosure is not limited to the above-described embodiments, and various modified examples within the scope of the disclosure can be adopted.

What is claimed is:

1. A moving body detection system that detects a moving body present in a blind spot of a driver of a host vehicle, the moving body detection system comprising:
a first terminal control device that is installed in a first terminal capable of being carried by a person and that transmits signals to an outside;
a reception device that receives signals transmitted by the first terminal control device; and
a main control device that determines whether the moving body is present in the blind spot,
the main control device being configured to execute a first terminal signal acquisition process for acquiring, as a first terminal signal, a signal that the reception device has received from the first terminal control device, and when the first terminal signal is acquired by the first terminal signal acquisition process, determine whether a blind-spot condition that the moving body is present in the blind spot is met based on the acquired first terminal signal,
wherein the main control device is configured to execute the first terminal signal acquisition process on a first cycle when it is determined that the blind-spot condition is not met, and execute the first terminal signal acquisition process on a second cycle that is shorter than the first cycle when it is determined that the blind-spot condition is met.

2. The moving body detection system according to claim 1, wherein the reception device is installed in the host vehicle.

3. The moving body detection system according to claim 1, wherein the main control device is installed in the host vehicle.

4. The moving body detection system according to claim 1, further comprising a display device that displays an image at such a position that the driver is able to visually recognize the image, wherein:
the display device is installed in the host vehicle; and
the main control device is configured to, when it is determined that the blind-spot condition is met, cause the display device to display an image representing the moving body present in the blind spot.

5. The moving body detection system according to claim 1, wherein the first terminal is a mobile phone terminal or a terminal capable of being worn by a person.

6. The moving body detection system according to claim 1, further comprising a second terminal control device that is installed in a second terminal capable of being carried by a person, wherein:
the reception device is installed in the second terminal; and
the main control device is configured to, when it is determined that the second terminal is present inside the host vehicle, acquire the first terminal signal through the reception device.

7. The moving body detection system according to claim 1, further comprising a second terminal control device that is installed in a second terminal capable of being carried by a person, wherein:
the main control device is the second terminal control device; and
the main control device is configured to, when it is determined that the second terminal is present inside the host vehicle and the first terminal signal is acquired, determine whether the blind-spot condition is met based on the first terminal signal.

8. The moving body detection system according to claim 1, further comprising a display device that displays an image at such a position that the driver is able to visually recognize the image, and a second terminal control device that is installed in a second terminal capable of being carried by a person, wherein:
the display device is installed in the second terminal; and
the main control device is configured to, when it is determined that the second terminal is present inside the host vehicle and the first terminal signal is acquired, determine whether the blind-spot condition is met based on the first terminal signal, and when it is determined that the blind-spot condition is met, cause the display device to display an image representing the moving body present in the blind spot.

9. The moving body detection system according to claim 6, wherein the second terminal is a mobile phone terminal or a terminal capable of being worn by a person.

10. The moving body detection system according to claim 1, wherein the main control device is configured to, when the blind-spot condition is met, notify the driver that the moving body is present in the blind spot.

11. The moving body detection system according to claim 1, further comprising a detection device that detects a state on a front side in an advancing direction of the host vehicle, wherein:
the detection device is installed in the host vehicle; and
the main control device is configured to acquire, as front-side state detection information, information about a state detected by the detection device, and specify the blind spot based on the acquired front-side state detection information.

12. The moving body detection system according to claim 1, further comprising a detection device that detects a state on a front side in an advancing direction of the host vehicle, wherein:
the detection device is installed on a road; and
the main control device is configured to acquire, as front-side state detection information, information about a state detected by the detection device, and specify the blind spot based on the acquired front-side state detection information.

13. The moving body detection system according to claim 1, further comprising a detection device that detects a state on a front side in an advancing direction of the host vehicle, wherein:
the detection device is installed in the host vehicle; and
the main control device is configured to acquire, as front-side state detection information, information about a state detected by the detection device, and when it is determined that the moving body is not present on the front side in the advancing direction of the host vehicle based on the front-side state detection information and it is determined that the first terminal is present on the front side in the advancing direction of the host vehicle based on the first terminal signal, determine that the blind-spot condition is met.

14. The moving body detection system according to claim 1, further comprising a detection device that detects a state on a front side in an advancing direction of the host vehicle, wherein:
the detection device is installed on a road; and
the main control device is configured to acquire, as front-side state detection information, information about a state detected by the detection device, and when it is determined that the moving body is not present on the front side in the advancing direction of the host vehicle based on the front-side state detection information and it is determined that the first terminal is present on the front side in the advancing direction of the host vehicle based on the first terminal signal, determine that the blind-spot condition is met.

15. The moving body detection system according to claim 1, wherein the main control device is configured to specify the blind spot based on a current position of the host vehicle and map information on surroundings of the host vehicle.

* * * * *